(12) United States Patent
Yerramalli et al.

(10) Patent No.: US 12,493,100 B2
(45) Date of Patent: Dec. 9, 2025

(54) PASSIVE POSITIONING WITH ANALOG BEAMFORMING

(71) Applicant: QUALCOMM Incorporated, San Diego, CA (US)

(72) Inventors: Srinivas Yerramalli, Hyderabad (IN); Xiaoxia Zhang, San Diego, CA (US); Taesang Yoo, San Diego, CA (US); Alexandros Manolakos, Escondido, CA (US); Lorenzo Ferrari, Oakland, CA (US); Yih-Hao Lin, San Diego, CA (US); Rajat Prakash, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 17/307,287

(22) Filed: May 4, 2021

(65) Prior Publication Data

US 2021/0389410 A1 Dec. 16, 2021

Related U.S. Application Data

(60) Provisional application No. 63/038,152, filed on Jun. 12, 2020.

(51) Int. Cl.
*G01S 5/10* (2006.01)
*G01S 5/02* (2010.01)
(Continued)

(52) U.S. Cl.
CPC .............. *G01S 5/10* (2013.01); *G01S 5/0236* (2013.01); *H04B 7/06952* (2023.05);
(Continued)

(58) Field of Classification Search
CPC ....... G01S 5/10; G01S 5/0236; H04B 7/0897; H04B 17/27; H04W 64/003; H04L 5/0048
See application file for complete search history.

(56) References Cited

U.S. PATENT DOCUMENTS 7,047,009 B2 5/2006 Laroia et al.
8,660,574 B2 2/2014 Edge
(Continued)

FOREIGN PATENT DOCUMENTS

JP 2001045549 A 2/2001
JP 2008216231 A 9/2008
(Continued)

OTHER PUBLICATIONS

Moderator(Intel Corporation): "FL Summary #1 on DL Reference Signals for NR Positioning", 3GPP TSG-RAN WG1 #101-E, R1-2004726, e-Meeting, May 25, 2020-Jun. 5, 2020, May 30, 2020, pp. 1-17, Section 2.7.
(Continued)

*Primary Examiner* — Muthuswamy G Manoharan
(74) *Attorney, Agent, or Firm* — QUALCOMM Incorporated

(57) ABSTRACT

Techniques are provide for passive positioning of user equipment (UE) with analog beamforming. An example method for positioning a user equipment includes receiving a first positioning reference signal from a first base station at a first time, receiving a first timing difference value based on two or more positioning reference signals transmitted from the first base station, receiving a second positioning reference signal from a second base station at a second time, receiving a second timing difference value based on two or more positioning reference signals transmitted from the second base station, and determining a time difference of arrival between the first positioning reference signal and the
(Continued)

second positioning reference signal based at least in part on the first timing difference value and the second timing difference value.

44 Claims, 14 Drawing Sheets

(51) Int. Cl.
*H04B 7/06* (2006.01)
*H04B 7/08* (2006.01)
*H04B 17/27* (2015.01)
*H04L 5/00* (2006.01)
*H04W 64/00* (2009.01)

(52) U.S. Cl.
CPC ........... *H04B 7/0897* (2013.01); *H04B 17/27* (2015.01); *H04L 5/0048* (2013.01); *H04W 64/003* (2013.01)

(56) References Cited

U.S. PATENT DOCUMENTS

| | | | |
|---|---|---|---|
| 2014/0187259 A1 | 7/2014 | Kakani et al. | |
| 2015/0156746 A1* | 6/2015 | Horne | G01S 5/10 |
| | | | 455/456.6 |
| 2015/0188678 A1* | 7/2015 | Wu | G01S 1/14 |
| | | | 455/456.6 |
| 2018/0217228 A1* | 8/2018 | Edge | H04W 64/00 |
| 2019/0037529 A1 | 1/2019 | Edge et al. | |
| 2019/0045477 A1 | 2/2019 | Edge | |
| 2019/0380056 A1* | 12/2019 | Lee | H04B 7/0695 |
| 2020/0021946 A1 | 1/2020 | Kumar et al. | |
| 2020/0028648 A1 | 1/2020 | Akkarakaran et al. | |
| 2020/0137607 A1 | 4/2020 | Akkarakaran et al. | |
| 2021/0076225 A1* | 3/2021 | Kim | H04W 80/02 |
| 2021/0320769 A1* | 10/2021 | Cha | H04W 48/12 |
| 2022/0174641 A1* | 6/2022 | Cha | H04W 64/00 |
| 2022/0279367 A1* | 9/2022 | Hwang | H04L 5/0048 |
| 2022/0393820 A1* | 12/2022 | Keating | H04W 56/001 |
| 2023/0116323 A1* | 4/2023 | Cha | H04L 5/0091 |
| | | | 370/329 |

FOREIGN PATENT DOCUMENTS

| | | |
|---|---|---|
| JP | 2011252632 A | 12/2011 |
| JP | 2014503799 A | 2/2014 |
| JP | 2016105102 A | 6/2016 |
| WO | 2005062633 | 7/2005 |
| WO | 2009124206 | 10/2009 |
| WO | 2019141090 A1 | 7/2019 |
| WO | WO-2020069083 A1 | 4/2020 |

OTHER PUBLICATIONS

Taiwan Search Report—TW110116600—TIPO—Dec. 25, 2024.
CATT: "Sunmary of UE and gNB Measurements for NR Positioning", 3GPP Draft, 3GPP TSG RAN WG1 Meeting #98, R1-1908574 FL Summary of NR POS Measurements, 3RD Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019 Sep. 3, 2019 (Sep. 3, 2019), XP051765182, pp. 1-29, Retrieved from the Internet: URL:http://www.3gpp.org/ftp/tsg_ran/WG1_RL1/TSGR1_98/Docs/R1-1908574.zip, [retrieved on Sep. 3, 2019] p. 14, paragraph 3.5.
International Search Report and Written Opinion—PCT/US2021/030869—ISA/EPO—Aug. 9, 2021.

* cited by examiner

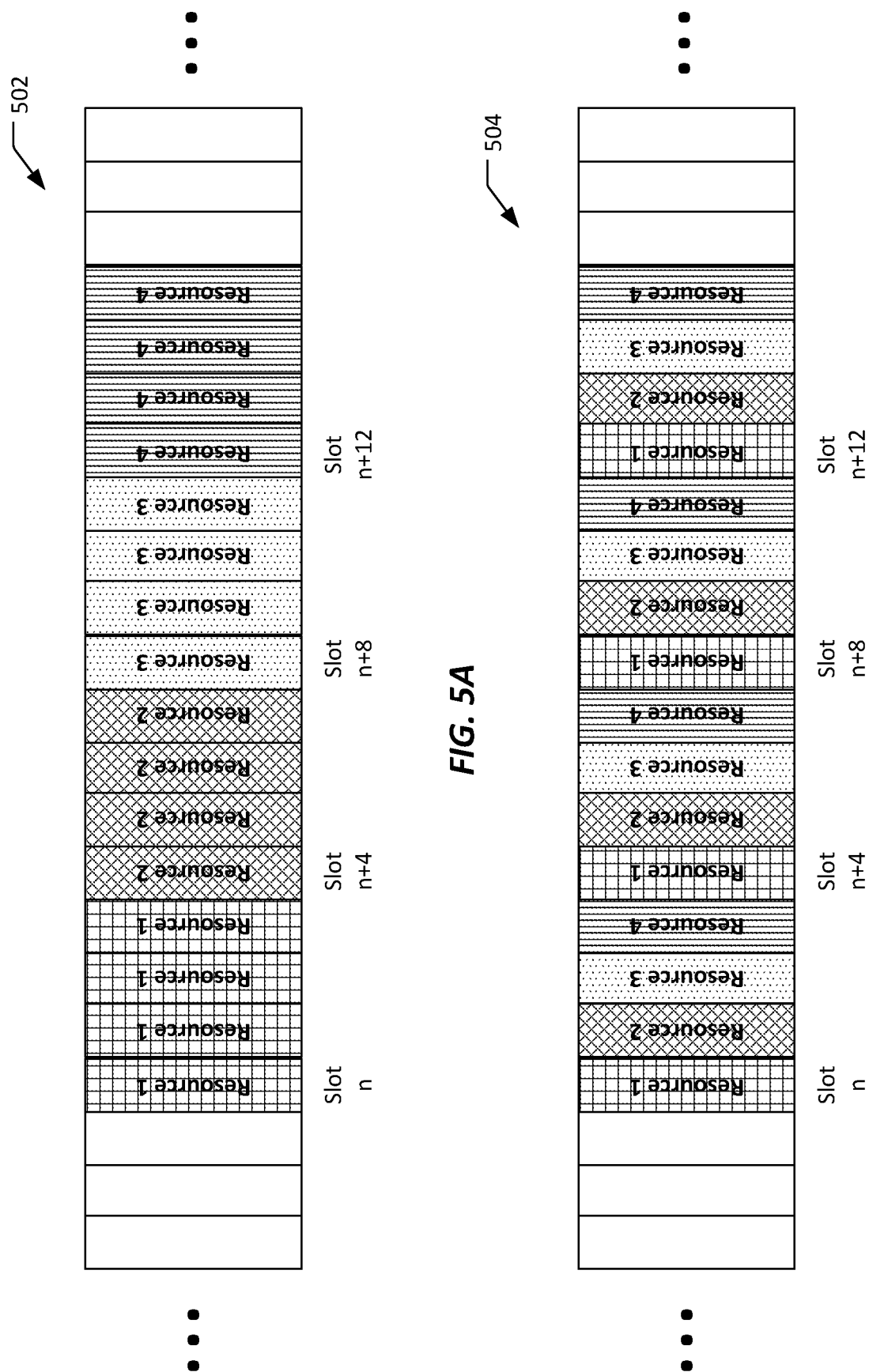

PASSIVE POSITIONING WITH ANALOG BEAMFORMING

CROSS-REFERENCE TO RELATED APPLICATIONS

This application claims the benefit of U.S. Provisional Application No. 63/038,152, filed Jun. 12, 2020, entitled "PASSIVE POSITIONING WITH ANALOG BEAMFORMING," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points.

SUMMARY

An example method for positioning a user equipment according to the disclosure includes receiving a first positioning reference signal from a first wireless node at a first time, receiving a first timing difference value based on two or more positioning reference signals transmitted from the first wireless node, receiving a second positioning reference signal from a second wireless node at a second time, receiving a second timing difference value based on two or more positioning reference signals transmitted from the second wireless node, and determining a time difference of arrival between the first positioning reference signal and the second positioning reference signal based at least in part on the first timing difference value and the second timing difference value.

Implementations of such a method may include one or more of the following features. A turn-around time value and a time of flight value associated with the first positioning reference signal and the second positioning reference signal may be received. The first timing difference value may be received from the first wireless node and the second timing difference value is received from the second wireless node. The first timing difference value and the second timing difference value may be received from a network server or a serving station. The first timing difference value may be included in the first positioning reference signal, and the second timing difference value may be included in the second positioning reference signal. The first timing difference value and the second timing difference value may be received via a higher layer protocol. The first timing difference value may be associated with a beam identification value of the first positioning reference signal. The second wireless node may be a second user equipment and the second positioning reference signal is received via a sidelink transmitted from the second user equipment. The first positioning reference signal may be transmitted via a beam transmitted from the first wireless node. The method may include determining a position estimate based at least in part on the time difference of arrival. The first positioning reference signal and the second positioning reference signal may be from the same or different frequency layers.

An example method for providing positioning reference signals according to the disclosure includes transmitting a positioning reference signal to a station at first time, transmitting the positioning reference signal to a user equipment at a second time, and transmitting a timing difference value based on the first time and the second time to the user equipment.

Implementations of such a method may include one or more of the following features. Transmitting the positioning reference signal to the station may include beamforming the positioning reference signal based on a location of the station. Transmitting the positioning reference signal to the user equipment may include beamforming the positioning reference signal based on a location of the user equipment. The method may include receiving a second positioning reference signal from the station at a third time, and transmitting the third time to the user equipment. Transmitting the positioning reference signal to the station at the first time may include transmitting the positioning reference signal from a second user equipment. Transmitting the positioning reference signal to the user equipment may include transmitting a sidelink signal to the user equipment. The timing difference value may be transmitted via a higher layer protocol. The timing difference value may be transmitted to the user equipment with the positioning reference signal. The positioning reference signal may be transmitted via a sweeping beam.

An example apparatus for positioning a user equipment according to the disclosure includes a memory, at least one transceiver, at least one processor communicatively coupled to the memory and the at least one transceiver and configured to receive a first positioning reference signal from a first wireless node at a first time, receive a first timing difference value based on two or more positioning reference signals transmitted from the first wireless node, receive a second positioning reference signal from a second wireless node at a second time, receive a second timing difference value based on two or more positioning reference signals transmitted from the second wireless node, and determine a time difference of arrival between the first positioning reference signal and the second positioning reference signal based at least in part on the first timing difference value and the second timing difference value.

Implementations of such an apparatus may include one or more of the following features. The at least one processor may be further configured to receive a turn-around time value and a time of flight value associated with the first positioning reference signal and the second positioning reference signal. The first timing difference value may be received from the first wireless node and the second timing difference value is received from the second wireless node. The first timing difference value and the second timing difference value may be received from a network server or a serving station. The first timing difference value may be included in the first positioning reference signal, and the second timing difference value may be included in the second positioning reference signal. The first timing difference value and the second timing difference value may be received via a higher layer protocol. The first timing difference value may be associated with a beam identification value of the first positioning reference signal. The second wireless node may be a second user equipment and the second positioning reference signal may be received via a sidelink transmitted from the second user equipment. The first positioning reference signal may be transmitted via a beam transmitted from the first wireless node. The at least one processor may be further configured to determine a position estimate based at least in part on the time difference of arrival. The first positioning reference signal and the second positioning reference signal may be from the same or different frequency layers.

An example apparatus for providing positioning reference signals according to the disclosure includes a memory, at least one transceiver, at least one processor communicatively coupled to the memory and the at least one transceiver and configured to transmit a positioning reference signal to a station at first time, transmit the positioning reference signal to a user equipment at a second time, and transmit a timing difference value based on the first time and the second time to the user equipment.

Implementations of such an apparatus may include one or more of the following features. The at least one processor may be further configured to beamform the positioning reference signal based on a location of the station, to beamform the positioning reference signal based on a location of the user equipment, receive a second positioning reference signal from the station at a third time, transmit the third time to the user equipment, to transmit the positioning reference signal from a second user equipment, and to transmit a sidelink signal to the user equipment. The timing difference value may be transmitted via a higher layer protocol. The timing difference value may be transmitted to the user equipment with the positioning reference signal. The at least one processor may be further configured to transmit the positioning reference signal via a sweeping beam.

An example apparatus for positioning a user equipment according to the disclosure includes means for receiving a first positioning reference signal from a first wireless node at a first time, means for receiving a first timing difference value based on two or more positioning reference signals transmitted from the first wireless node, means for receiving a second positioning reference signal from a second wireless node at a second time, means for receiving a second timing difference value based on two or more positioning reference signals transmitted from the second wireless node, and means for determining a time difference of arrival between the first positioning reference signal and the second positioning reference signal based at least in part on the first timing difference value and the second timing difference value.

An example apparatus for providing positioning reference signals according to the disclosure includes means for transmitting a positioning reference signal to a station at first time, means for transmitting the positioning reference signal to a user equipment at a second time, and means for transmitting a timing difference value based on the first time and the second time to the user equipment.

An example non-transitory processor-readable storage medium comprising processor-readable instructions configured to cause one or more processors for positioning a user equipment according to the disclosure includes code for receiving a first positioning reference signal from a first wireless node at a first time, code for receiving a first timing difference value based on two or more positioning reference signals transmitted from the first wireless node, code for receiving a second positioning reference signal from a second wireless node at a second time, code for receiving a second timing difference value based on two or more positioning reference signals transmitted from the second wireless node, and code for determining a time difference of arrival between the first positioning reference signal and the second positioning reference signal based at least in part on the first timing difference value and the second timing difference value.

An example non-transitory processor-readable storage medium comprising processor-readable instructions configured to cause one or more processors for providing positioning reference signals according to the disclosure includes code for transmitting a positioning reference signal to a station at first time, code for transmitting the positioning reference signal to a user equipment at a second time, and code for transmitting a timing difference value based on the first time and the second time to the user equipment.

Items and/or techniques described herein may provide one or more of the following capabilities, as well as other capabilities not mentioned. A first wireless node may transmit a beamformed positioning reference signal to a second wireless node at a first time, and to a user equipment at a second time. The second wireless node may transmit a beamformed positioning reference signal to the first station at a third time, and to the user equipment at a fourth time. The user equipment may utilize the time of arrivals of the beam formed positioning reference signals and the difference in transmission times of the beamformed positioning reference signals to determine a position based on the reference signal time difference. The beamformed positioning reference signals may be sweeping beams. Other capabilities may be provided and not every implementation according to the disclosure must provide any, let alone all, of the capabilities discussed.

BRIEF DESCRIPTION OF THE DRAWINGS

FIGS. 5A and 5B illustrate example downlink positioning reference signal resource sets.

DETAILED DESCRIPTION

Techniques are discussed herein for passive positioning of user equipment (UE) with analog beamforming. 5G NR includes several positioning methods such as downlink (DL) and uplink (UL) Time Difference of Arrival (TDOA), DL Angle of Departure (AoD), UL Angle of Arrival (AoA), DL initiated Round Trip Time (RTT), and combinations of these methods. In general, some TDOA methods may require network synchronization. In contrast, RTT based methods are not dependent on network synchronization. Simultaneously positioning user equipment in high density areas (e.g., stadiums, convention centers, Internet of Things (IoT) installations, and Industrial IoT (IIoT), etc.) may present challenges associated with messaging and bandwidth limitations. For example, RTT methods require transmissions from each UE and thus may not be scalable in UE dense environments. DL TDOA based methods, however, with time synchronized NR networks may be scaled to a large number of devices without exceeding bandwidth limitations. For example, fixed overhead positioning reference signal (PRS) transmissions from wireless nodes, such as base stations, may be used. The PRS transmissions are independent from the number of UEs and the UEs are not required to transmit responses to the PRS transmissions. The beamforming aspects of 5G NR provides challenges for passive positioning with PRS transmissions because relative locations of base stations and UEs may require different PRS beams.

The techniques provided herein utilize passive positioning techniques with analog beam forming. For example, a first wireless node may provide a first PRS on a first beam to a second wireless node and a second beam to a UE. In response to receiving the first PRS beam from the first wireless node, the second wireless node may transmit a second PRS on a first beam to the first wireless node, and a second beam to the UE. The UE may be configured to utilize the time difference of arrival of the first and second PRS and the corresponding transmission times of the beams to compute a TDOA position. These techniques and configurations are examples, and other techniques and configurations may be used.

Figure 1:
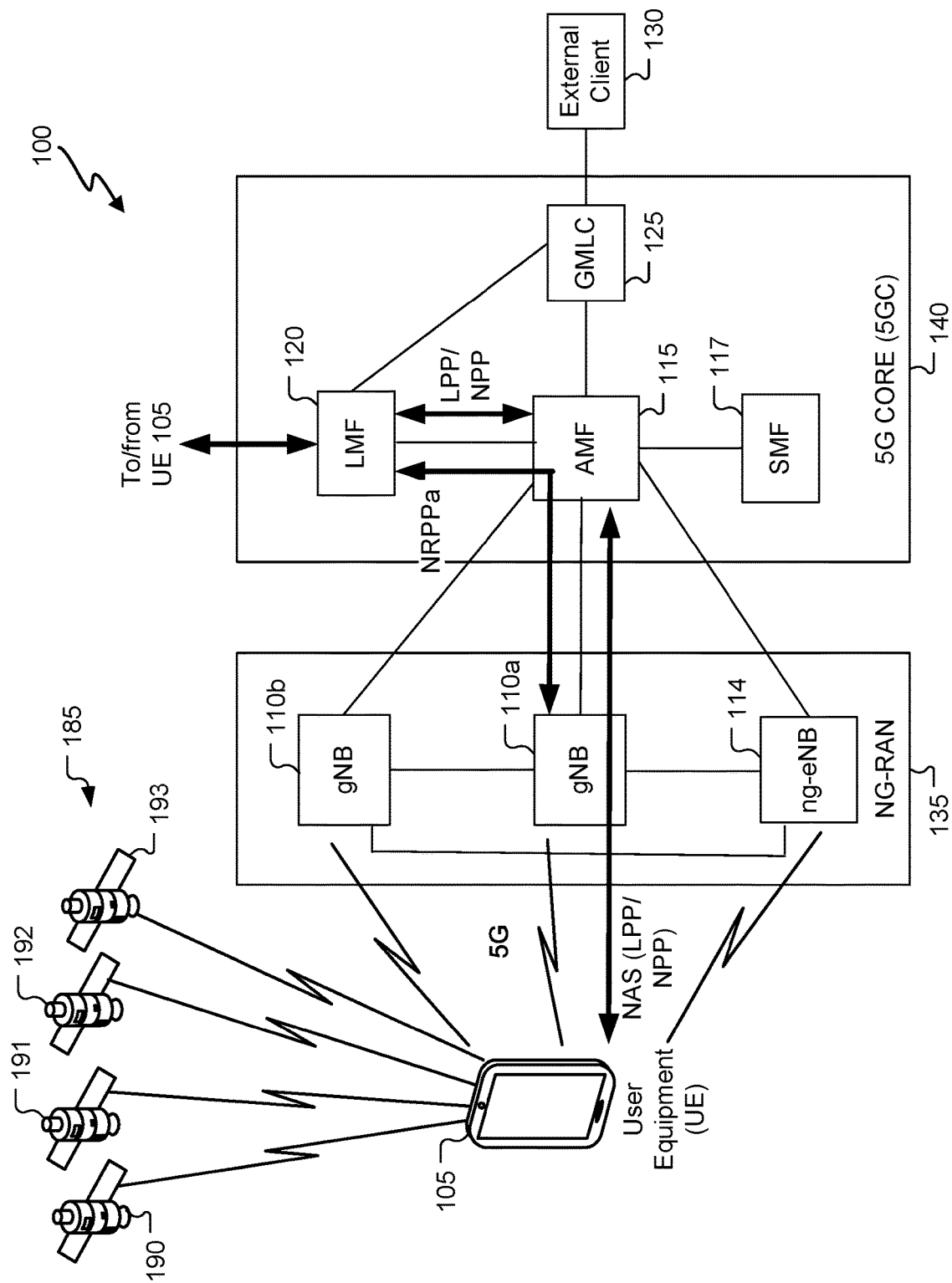
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3' Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional PRS or SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
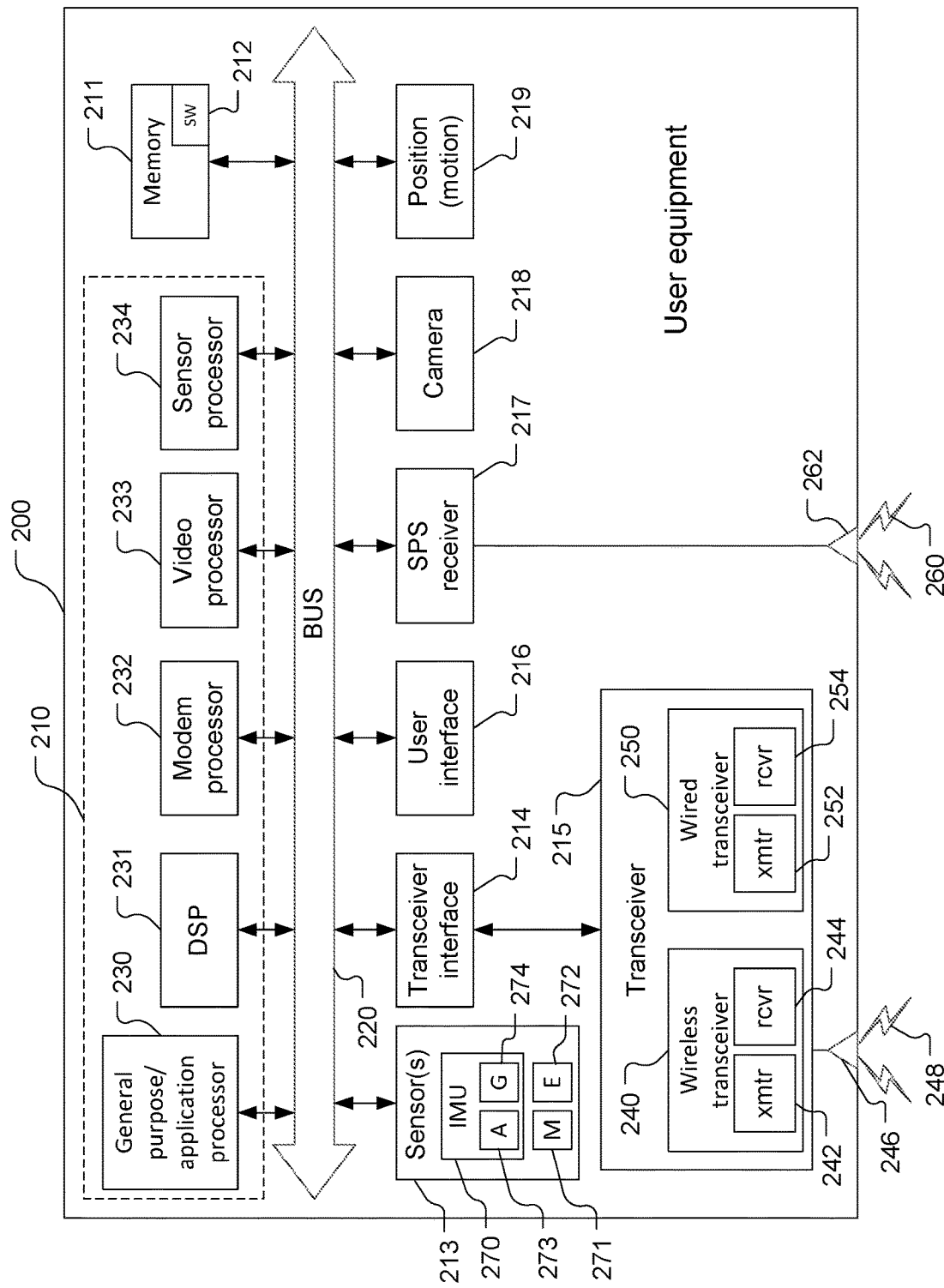
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 120 regarding the mobility of the UE 200. For example, based on the information obtained/measured by the sensor(s) 213, the UE 200 may notify/report to the server 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (Vehicle-to-Everything), (PC5), V2C (Uu), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-toanalog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
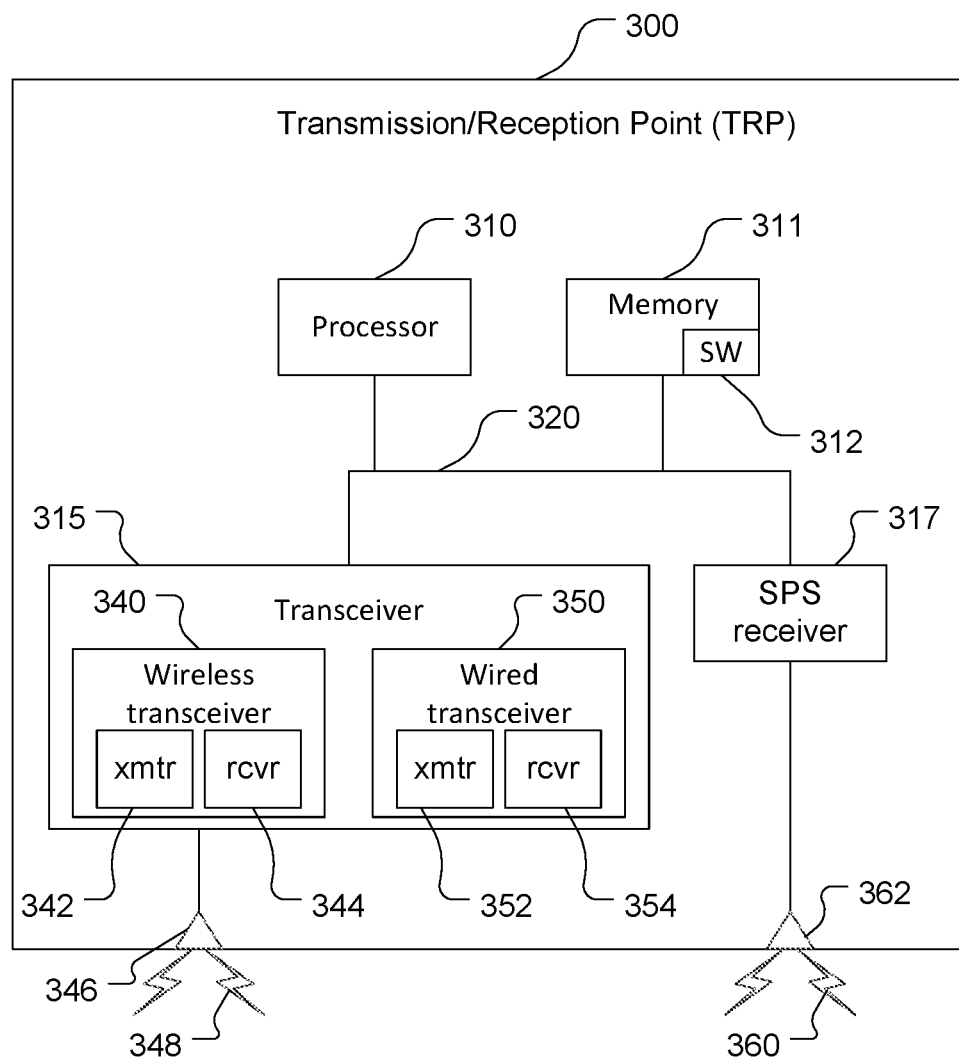
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the server 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the server 120 and/or the UE 200 (i.e., the server 120 and/or the UE 200 may be configured to perform one or more of these functions).

Figure 4:
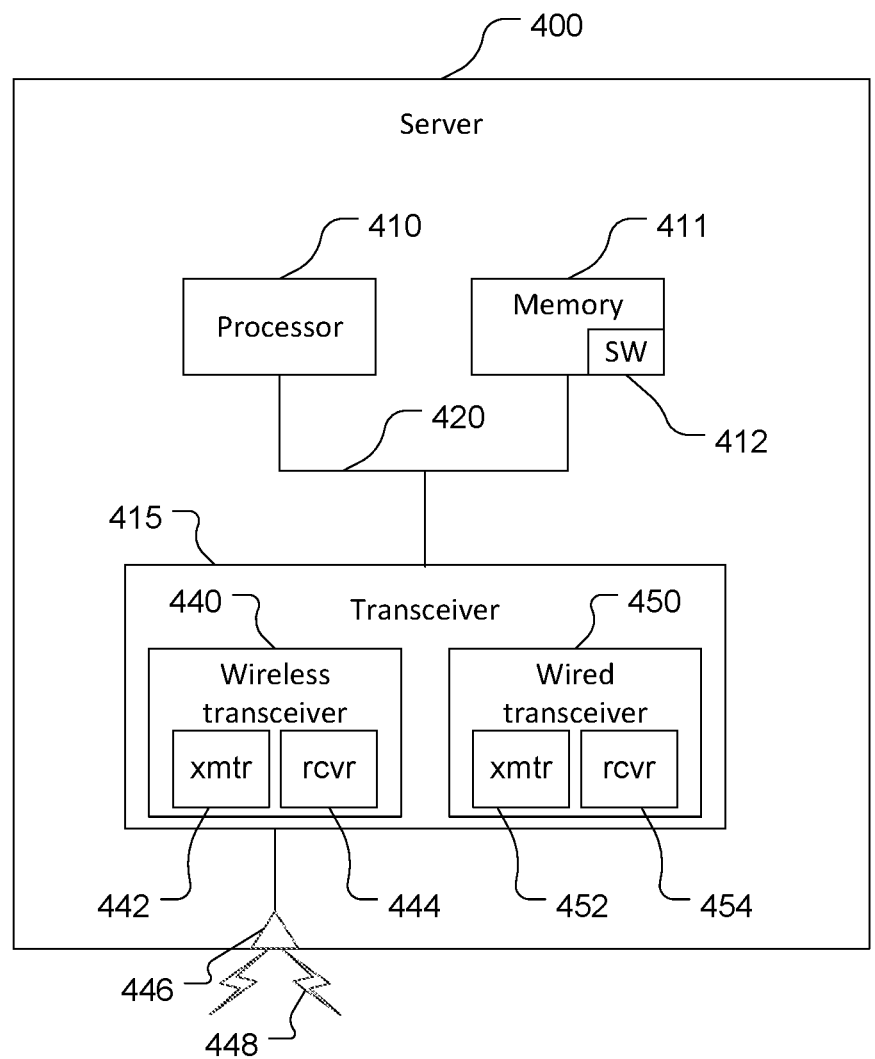
FIG. 4 is a block diagram of components of an example server shown in FIG. 1.

Referring also to FIG. 4, an example of the server 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the server 120) performing a function as shorthand for one or more appropriate components of the server 400 (e.g., the server 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 5C:
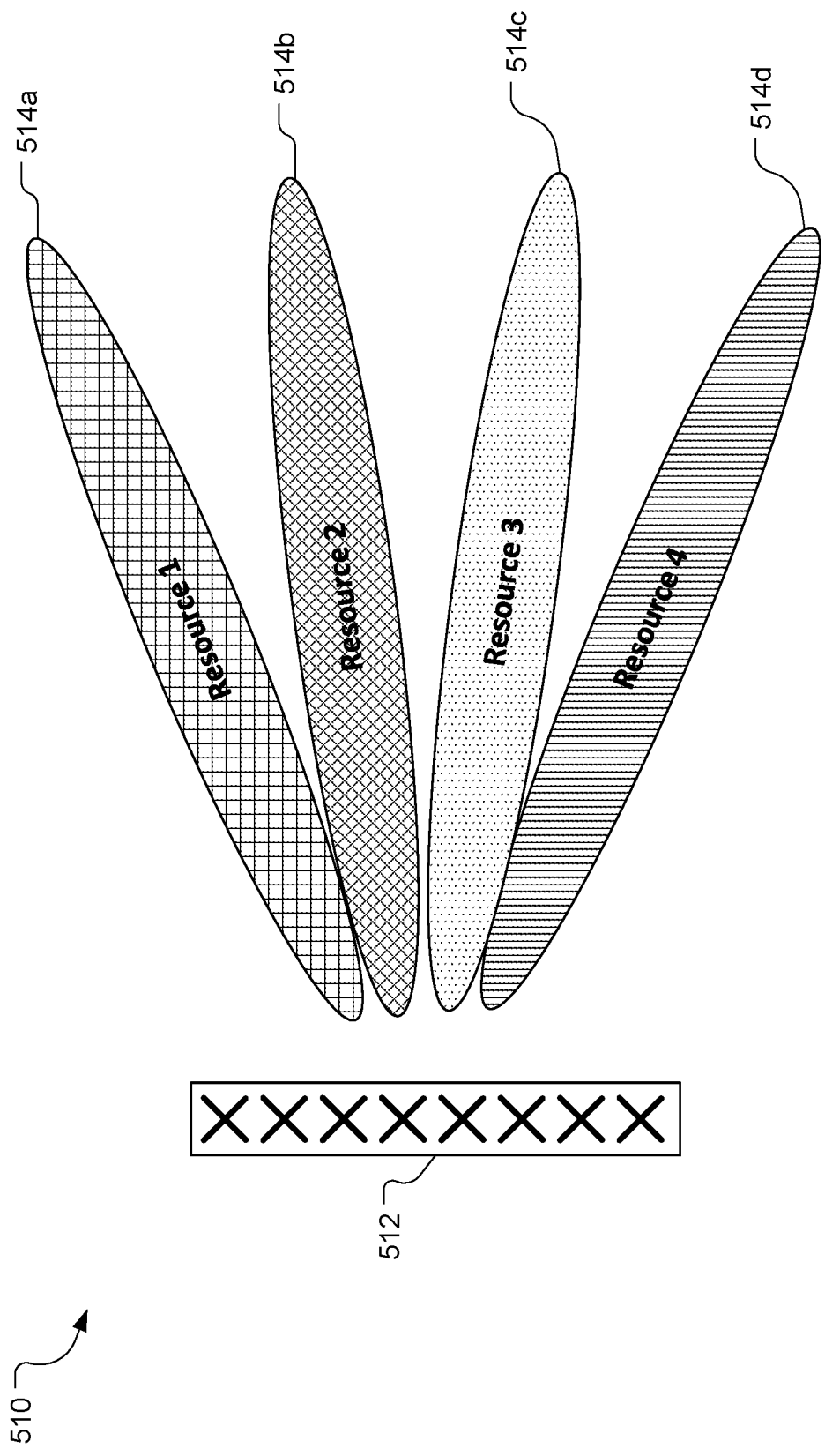
FIG. 5C illustrates an example beam sweeping configuration with the positioning reference signal resource sets of FIGS. 5A and 5B.

Referring to FIG. 5C, with further reference to FIGS. 5A and 5B, an example beam sweeping configuration 510 is shown. In general, higher frequency (e.g., millimeter wave) communications systems may utilize beamforming technology to direct transmit and receive beams. For example, a multielement antenna array 512 may be configured to utilize beamforming to transmit the PRSs. One or more analog and/or digital circuits in one or more transceivers may be configured to vary the azimuth angles and beam widths of a plurality of PRS transmissions such as a first resource 514a, a second resource 514b, a third resource 514c, and a fourth resource 514d. The number of beams, angles and beam widths depicted in FIG. 5C are examples, and not limitations, as the antenna array 512 may be configured to beamform a variety of beams with differing azimuths and widths. In an example, the antenna array 512 may be a two-dimensional array configured to generate beams of various azimuth and elevation angles. In general, in analog beamforming, analog phase-shifters may be utilized to amplify and direct a beam along a desired azimuth and/or elevation. Typically all four beams (e.g., the resources 514a-d) will not be simultaneously active when using beamforming. Beam sweeping may be used to activate the beams in an established sequential order. For example, referring to FIG. 5A, the first resource 514a may be active from slot n to slot n+3, the second resource 514b may be active from slot n+4 to slot n+7, the third resource 514c may be active from slot n+8 to slot n+11, and the fourth resource 514d may be active from slot n+12 to slot n+15. Additional resources and timing variations may also be used. In another example, referring to FIG. 5B, each of the resources 514a-d may be active for one slot before progressing to the next resource. In general, the term beam sweeping may be used to define a planned progression of resources with beamforming technologies. For example, beam sweeping may be used to progress resources based on a clockwise or a counter-clockwise motion relative to an antenna array. In another example, beam sweeping signals may utilize other planned beam progressions such as inside-to-outside (e.g., in the order of 514b, 514c, 514a, 514d), or outside-to-inside (e.g., in the order of 514a, 514d, 514b, 514c), or other planned progressions based on the number and orientations of the resources. In contrast to beam sweeping, beamforming technologies may also be used to generate discrete beams without a planned progression. For example, a specific resource may be selected based on a known location of another station or UE. Thus, beamforming may be used to establish a connection with another station when required (i.e., without waiting for a beam sweep cycle).

Figure 6:
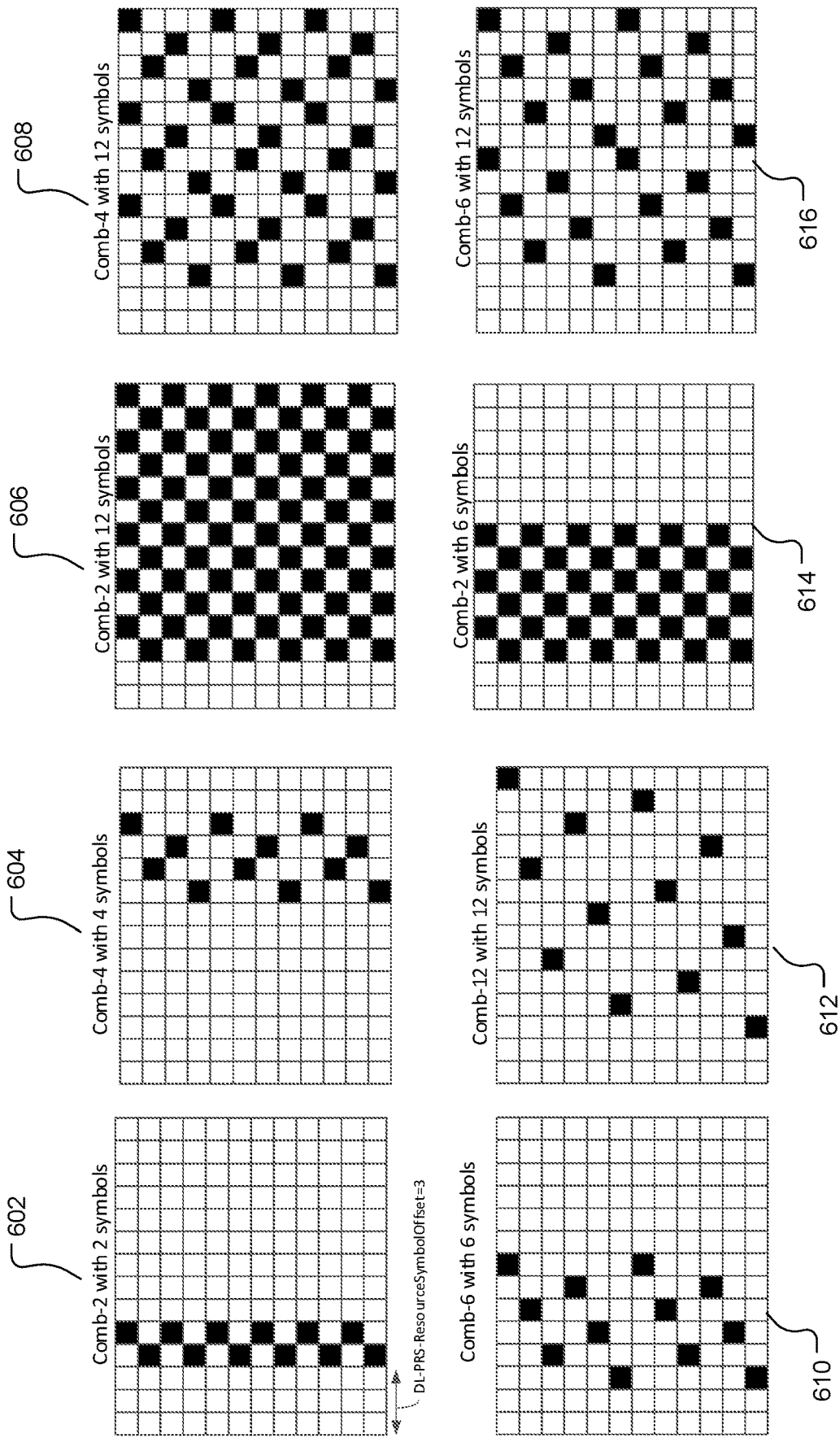
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A-5C. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity $T_{PRS}$, subframe offset $\Delta_{PRS}$, and PRS duration $N_{PRS}$. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity $T_{PRS}$ and the subframe offset $\Delta_{PRS}$ may be conveyed via a PRS configuration index $I_{PRS}$. The PRS configuration index and the PRS duration may be configured independently by higher layers. A set of $N_{PRS}$ consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A-5C may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

In an example, a positioning frequency layer may be a collection of PRS resource sets across one or more base stations. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS.

A PRS occasion is one instance of a periodically repeated time window (e.g., a group of one or more consecutive slots) where PRS are expected to be transmitted. A PRS occasion may also be referred to as a PRS positioning occasion, a positioning occasion, or simply an occasion.

Note that the terms positioning reference signal and PRS are reference signals that can be used for positioning, such as but not limited to, PRS signals in LTE, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 7:
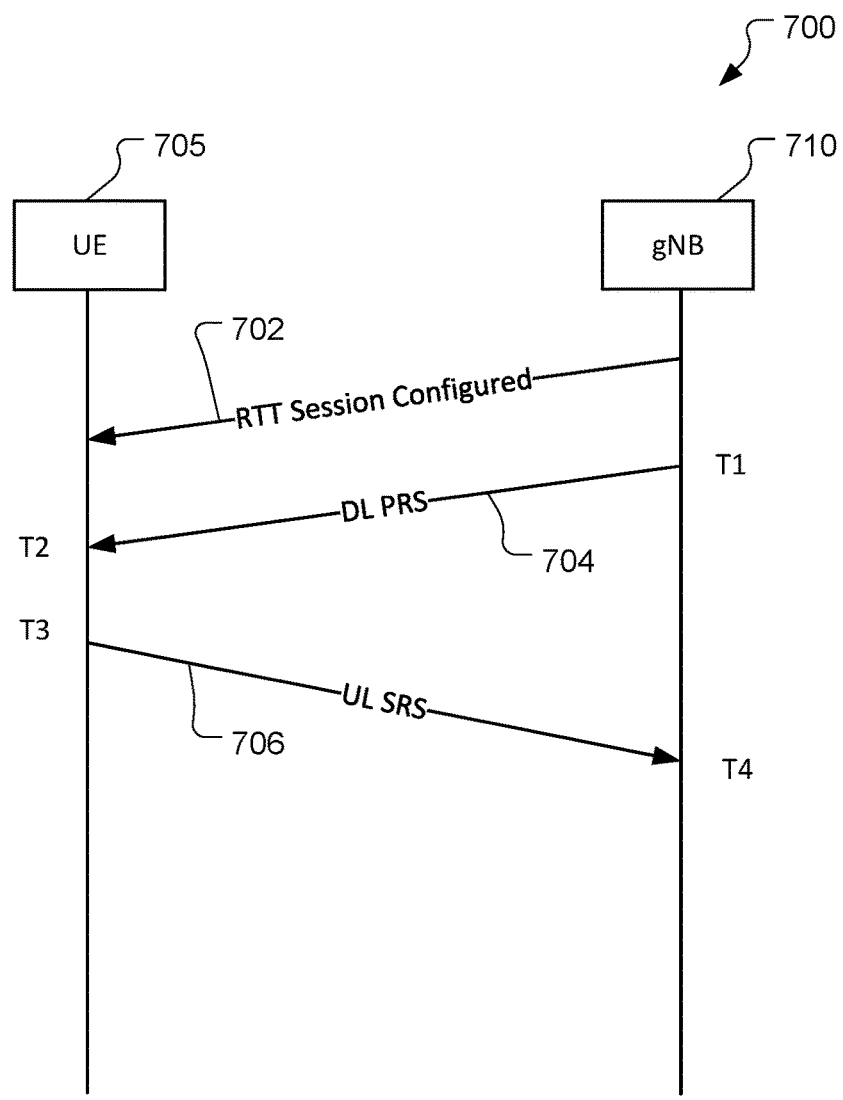
FIG. 7 is an example round trip time message flow between a user equipment and a base station.

Referring to FIG. 7, an example round trip message flow 700 between a user equipment 705 and a base station 710 is shown. The UE 705 is an example of the UE 105, 200 and the base station 710 may be a gNB 110a-b or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 700 may be initiated by the base station 710 with a RTT session configured message 702. The base station may utilize LPP/NRPPa messaging to configure the RTT session. At time T1, the base station 710 may transmit a DL PRS 704, which is received by the UE 705 at time T2. In response, the UE 705 may transmit a Sounding Reference Signal (SRS) for positioning message 706 at time T3 which is received by the base station 710 at time T4. The distance between the UE 705 and the base station 710 may be computed as:

$$\text{distance} = \frac{c}{2}((T4 - T1) - (T3 - T2)) \quad (1)$$

where $c$ = speed of light.

In dense operating environments, where there are many UEs exchanging RTT messages with base stations, the bandwidth required for the UL SRS for positioning messages may increase the messaging overhead and utilize excess network bandwidth. Passive positioning techniques may reduce the bandwidth required for positioning by eliminating or reducing transmissions from the UE.

Figure 8:
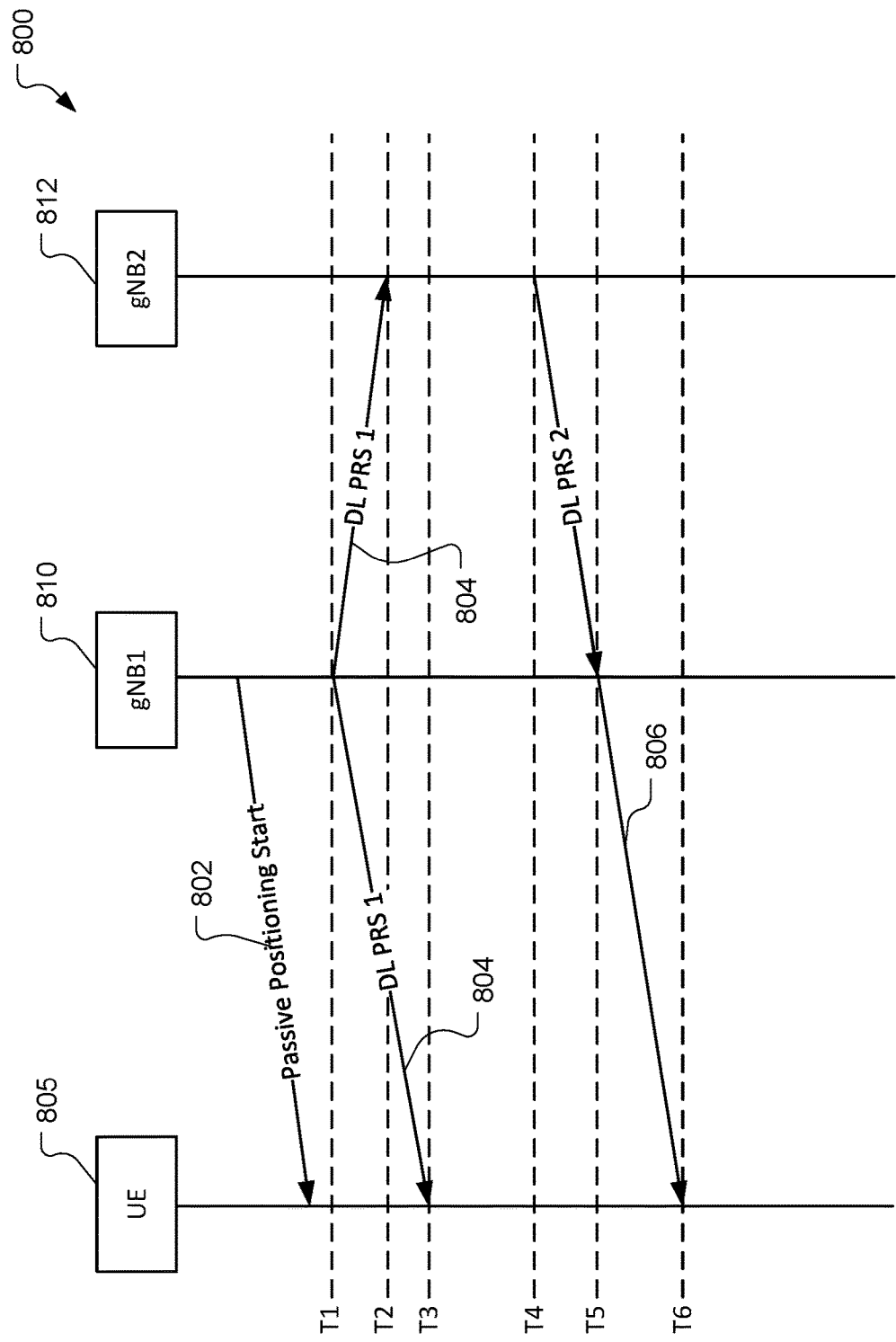
FIG. 8 is an example message flow for passive positioning of a user equipment.

Referring to FIG. 8, an example message flow 800 for passive positioning of a user equipment 805 is shown. The message flow includes the UE 805, a first base station 810 and a second base station 812. The UE 805 is an example of the UEs 105, 200, and the base stations 810, 812 are examples of the gNBs 110a-b or ng-eNB 114. In general, TDOA positioning techniques utilize the difference in travel times between one entity and other entities to determine relative ranges from the other entities and those, combined with known locations of the other entities may be used to determine the location of the one entity. Angles of arrival and/or departure may be used to help determine a location of an entity. For example, an angle of arrival or an angle of departure of a signal combined with a range between devices (determined using a signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 810 may provide a passive positioning start message 802 to the UE 805. The passive positioning start message 802 may be a broadcast message, or other signaling such as Radio Resource Control (RRC) signals, to inform the UE of a PRS transmission schedule and may include transmission information (e g, channel information, muting patterns, PRS bandwidth, PRS identification information, etc.). At time T1, the first station may transmit a first DL PRS 804 which may be received by the second base station 812 at time T2 (for example), and by the UE 805 at time T3. The second base station 812 may be configured to transmit a second DL PRS 806 at time T4, which is received by the first base station 810 at time T5 and by the UE 805 at time T6. The time between T2 and T4 may be a configured turn-around time on the second base station 812 and thus a known period of time. The time between T1 and T2 (i.e., time of flight) may also be known because the first and second base stations 810, 812 are in fixed locations. The turn-around time (i.e., T4-T2) and the time of flight (i.e., T2-T1) may be broadcast or otherwise provided to the UE 805 for use in positioning calculations. The UE 805 may observe the difference between T6 and T3, and the distances may be computed as:

$$D_{qNB1-UE} = \frac{c}{2}((T_3 - T_1)) \quad (2)$$

$$D_{qNB2-UE} = \frac{c}{2}((T_6 - T_1) - (T_4 - T_2) - (T_2 - T_1)) = \frac{c}{2}(T_6 - T_4) \quad (3)$$

$$D_{gNB2-UE} - D_{gNB1-UE} = \frac{c}{2}((T_6 - T_3) - (T_4 - T_2) - (T_2 - T_1)) \quad (4)$$

The message flow 800 is generally adequate when the UE 805 can overhear the first DL PRS 804 transmitted from the first base station 810 to the second base station 812, and can overhear the second DL PRS 806 transmitted from the second base station 812 to the first base station 810. Typically, lower frequency wireless networks (e.g., sub 6 GHz) may use omnidirectional DL PRS transmissions which may be heard by several stations. In some higher frequency 5G NR networks, however, millimeter wave (mmW) and beam-forming technologies are used to generate directional transmissions. Such directional beams may limit the ability of a UE to overhear the DL PRS transmissions between base stations.

Figure 9:
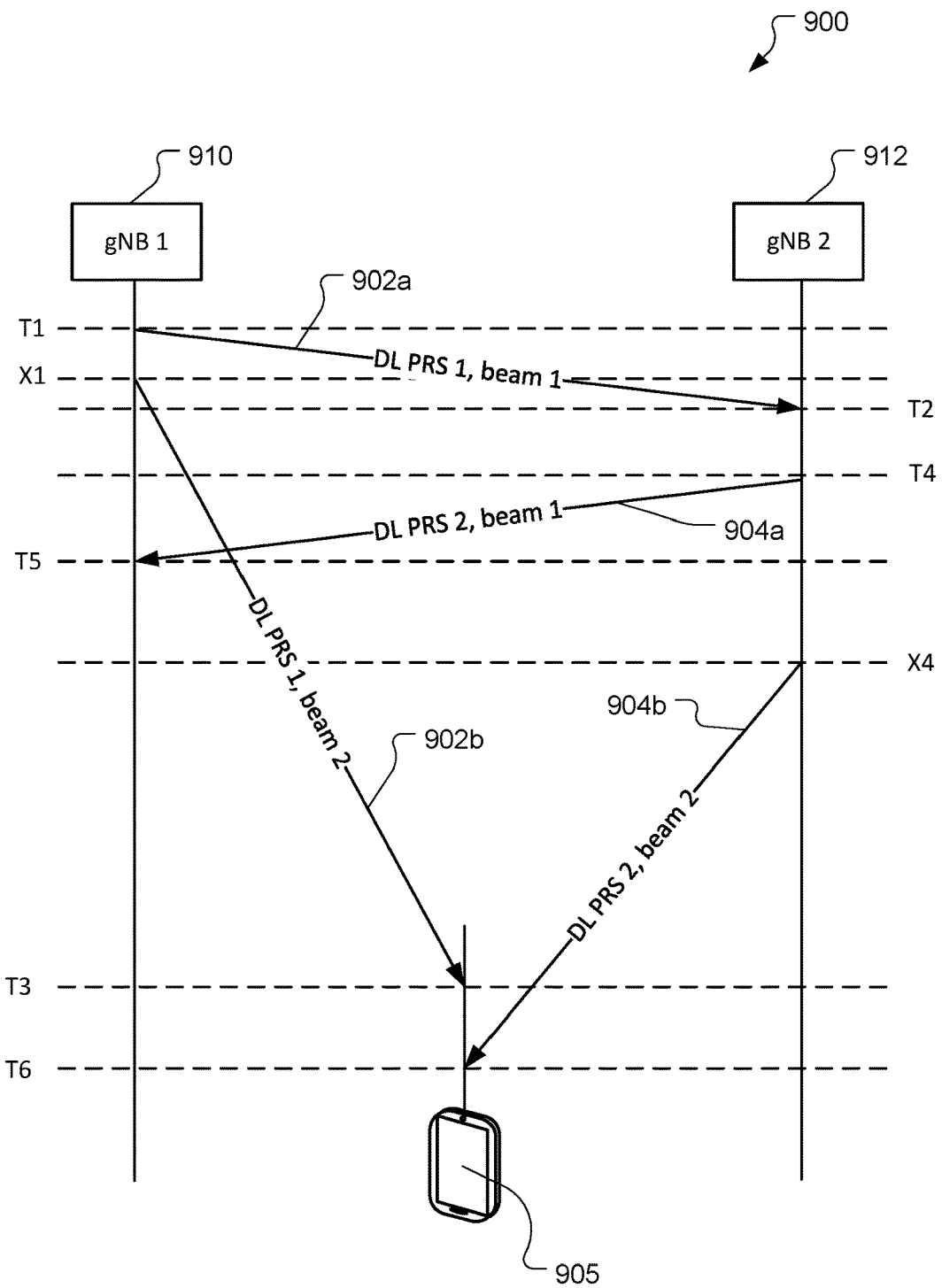
FIG. 9 is an example message flow for passive positioning with analog beam forming.

Referring to FIG. 9, with further reference to FIG. 8, an example message flow 900 for passive positioning with analog beam forming is shown. The message flow 900 includes a first base station 910, a second base station 912 and a UE 905. The base stations 910, 912 may include some or all of the components of the TRP 300, and the TRP 300 may be an example of a base station 910, 912. In an example, the base stations 910, 912 may be a gNB 110a-b or a ng-eNB 114. The UE 905 may include some or all of the components of the UE 200, and the UE 200 may be an example of the UE 905. The base stations 910, 912 are configured to transmit a plurality of PRS resources such as depicted in FIGS. 5A-5C. The PRS resources may be on the same frequency layer or on different frequency layers. In an example, the PRS may be an on-demand PRS (e.g., user or group specific), and/or may support different technologies such as LTE and NR (e.g., dynamic spectrum sharing). For example, the first base station 910 may be configured for LTE and the second base station 912 may be configured for 5G NR (e.g., mmW). In an example, one or both of the base stations 910, 912 may be configured for either or both LTE and 5G NR operations. Each of the PRS resources in the PRS resource sets 502, 504 may be configured to transmit a beam on a different azimuth and/or elevation. The transmit beam may be associated with the locations of other base stations. That is, the base stations may be configured to transmit a PRS based on the known locations of the base stations. In an example, the message flow 900 includes transmitting a first DL PRS on a first beam 902a at time T1 with the first base station 910, such that the first beam 902a is directed towards the second base station 912. The first beam 902a may be, for example, the first resource 514a. The first beam 902a is received by the second base station 912 at time T2. The first base station 910 transmits the first DL PRS on a second beam 902b at time X1. The second beam 902b may be, for example, the fourth resource 514d. The UE 905 is in a position to receive the second beam 902b at time T3. The second base station 912 is configured to transmit a second DL PRS on a first beam 904a at time T4, such that the first beam 904a is directed towards the first base station 910 and received at time T5. The second base station 912 also transmits the second DL PRS on a second beam 904b at time X4 and the UE 905 is in a position to receive the second beam 904b at time T6. The base stations 910, 912 may be configured to indicate (e.g., via broadcasting or other signaling) the time differences between the transmission of the respective first and second beams 902a-b, 904a-b. For example, the first base station 910 may indicate the timing difference X1-T1, and the second base station 912 may indicate the timing difference X4-T4. The indications from the base stations 910, 912 may include the turnaround time (e.g., T4-T2) and the time of flight (e.g., T2-T1). Other stations and servers (e.g., the LMF 120) may be configured to provide the indications and timing difference information to the UE 905. The first and second beams 902a-b, 904a-b may be transmitted with different technologies. For example, the first DL PRS on the first beam 902a may be an LTE/sub 6 GHz omnidirectional transmission and the second beam 902b may be a beamformed mmW beam (e.g., 5G NR). Other variations of technologies may be used for the respective beams 902a-b, 904a-b.

The UE 905, or a network resource (e.g., LMF 120 or other server 400) may be configured to perform a reference signal time difference (RSTD) measurement based on the time of arrivals T3 and T6 and compute distances between the stations, such that:

$$D_{qlNB1-UE} = \frac{c}{2}((T_3 - X_1)) = \frac{c}{2}((T_3 - T_1) - (X_1 - T_1)) \quad (5)$$

$$D_{qNB2-UE} = \frac{c}{2}((T_6 - T_1) - (T_4 - T_2) - (T_2 - T_1) - (X_4 - T_4)) = \frac{c}{2}(T_6 - X_4)$$

$$= \frac{c}{2}((T_6 - T_4) - (X_4 - T_4)) \quad (6)$$

$$D_{gNB2-UE} - D_{gNB1-UE} = \quad (7)$$
$$\frac{c}{2}((T_6 - T_3) - (T_4 - T_2) - (T_2 - T_1) - (X_4 - T_4) + (X_1 - T_1))$$

In an embodiment, the UE 905 may receive PRS resource configurations from a base station 910, 912, or other network resource such as the LMF 120, and determine which PRS resources (i.e., PRS beams) to utilize based on a position estimate. For example, the position estimate may be based on inertial navigation sensors such as the IMU 270. The PRS resource information may include the station location, PRS configuration information (e.g., PRS ID, carrier frequency, frequency shift (or vshift), PRS code sequence, muting sequence, bandwidth, and/or sets of transmission times), as well as the turnaround times, the time of flight information and the time difference indications for each of the PRS resources transmitted by the base stations. The PRS resource information may be included in RRC or other appropriate network signaling protocols. When the UE 905 is in an RRC connected mode, the UE 905 may be aware of the beam configurations for receiving appropriate PRS from neighboring base stations. The beam configuration information may reduce the amount of beam sweeping performed by the UE to receive the PRS transmissions.

Figure 10:
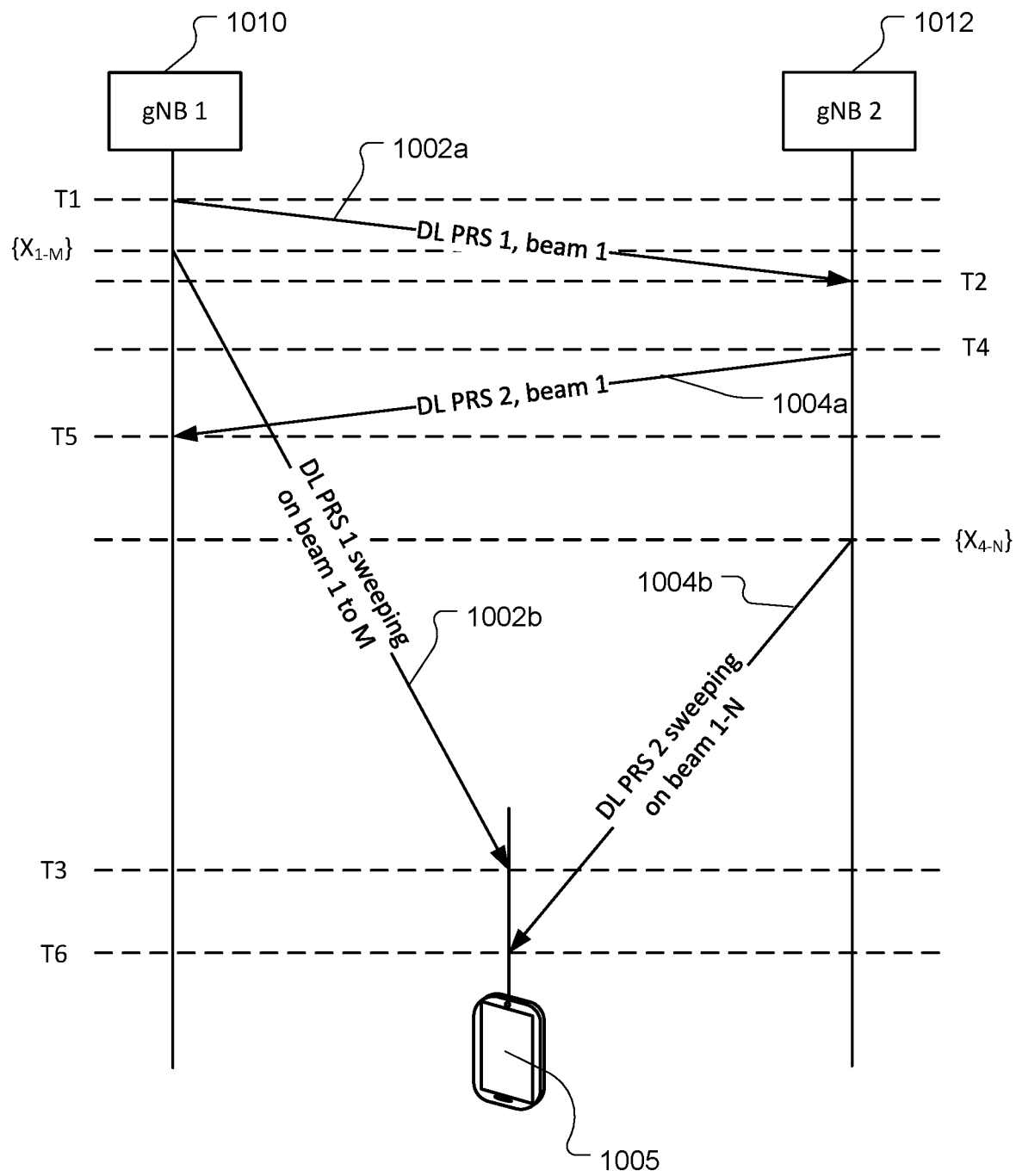
FIG. 10 is an example message flow for passive positioning with sweeping beams.

Referring to FIG. 10, an example message flow 1000 for passive positioning with sweeping beams in shown. The message flow 1000 includes a first base station 1010, a second base station 1012 and a UE 1005. The base stations 1010, 1012 may be gNBs 110a-b or ng-eNBs 114 and the UE 1005 is an example of the UEs 105, 200. In an example, the UE 1005 may be in an RRC idle and inactive state and the communication network may not be aware of the UE's 1005 beam association and tracking state. The base stations 1010, 1012 may be configured to beam sweep the PRS transmissions to cover potential locations of the UE 1005. The PRS resource set 502 may, for example, be configured to progress through the azimuth angles in a cell and provide the timing difference information associated with each beam to the UE 1005. For example, the first base station 1010 may transmit a first DL PRS on a first beam 1002a at time T1 and sweep the first DL PRS through M different beams (e.g., azimuths) in the cell sector. The first DL PRS on the first beam 1002a may be received by the second base station 1012 at time T2. The first DL PRS on the sweeping beam 1002b may be transmitted at time $X_{1-M}$, and received by the UE 1005 at time T3. For example, referring to FIG. 5A-5C, the first beam 1002a may be the first resource 514a and the sweeping beam 1002b may be the fourth resource 514d, where the first base station 1010 also transmitted the second and third resources 514b-c sequentially. The second base station 1012 is configured to transmit a second DL PRS on a first beam 1004a at time T4 which is received by the first base station 1010 at time T5. The second base station 1012 is configured to sweep the second DL PRS. At time $X_{4-N}$, the UE 1005 may receive a sweeping beam 1004b at time T6. The timing differences of the beam sweeps (e.g., $\{X_{1-M}\}$-T1 and $\{X_{4-N}\}$-T4) may be provided to the UE 1005 via network signaling (e.g., RRC, System Information Blocks (SIBs), etc.). The timing difference $\{X_{1-M}\}$-T1 corresponds to the timing difference of the first DL PRS on the first beam 1002a, and $\{X_{4-N}\}$-T4 corresponds to the timing difference of the second DL PRS on the first beam 1004a. When the UE 1005 receives the sweeping beam 1002b (e.g., beam i) from the first base station 1010, it obtains the timing difference of $X_i$-T1, as well as the corresponding received timing T3.

When the UE 1005 receives the sweeping beam 1004b (e.g., beam j) from the second base station 1012, it obtains the timing difference of $X_j-T4$, as well as the corresponding received timing T6. The UE 1005 is configured to utilize the timing and timing difference information to derive the RSTD values described in equations (5)-(7) above.

In an example, the first base station 1010 may not receive the second DL PRS on the first beam 1004a from the second base station 1012 (e.g., due to loss of beam correspondence, or other failure). The UE 1005 may be signaled to abort the RSTD procedure until a new beam correspondence is established. The signaling may be based on network channels (e.g., Physical Downlink Control Channel (PDCCH)) or other messaging protocols (e.g., Medium Access Control Control Element (MAC-CE), LPP, RRC, SIB, etc.).

Figure 11:
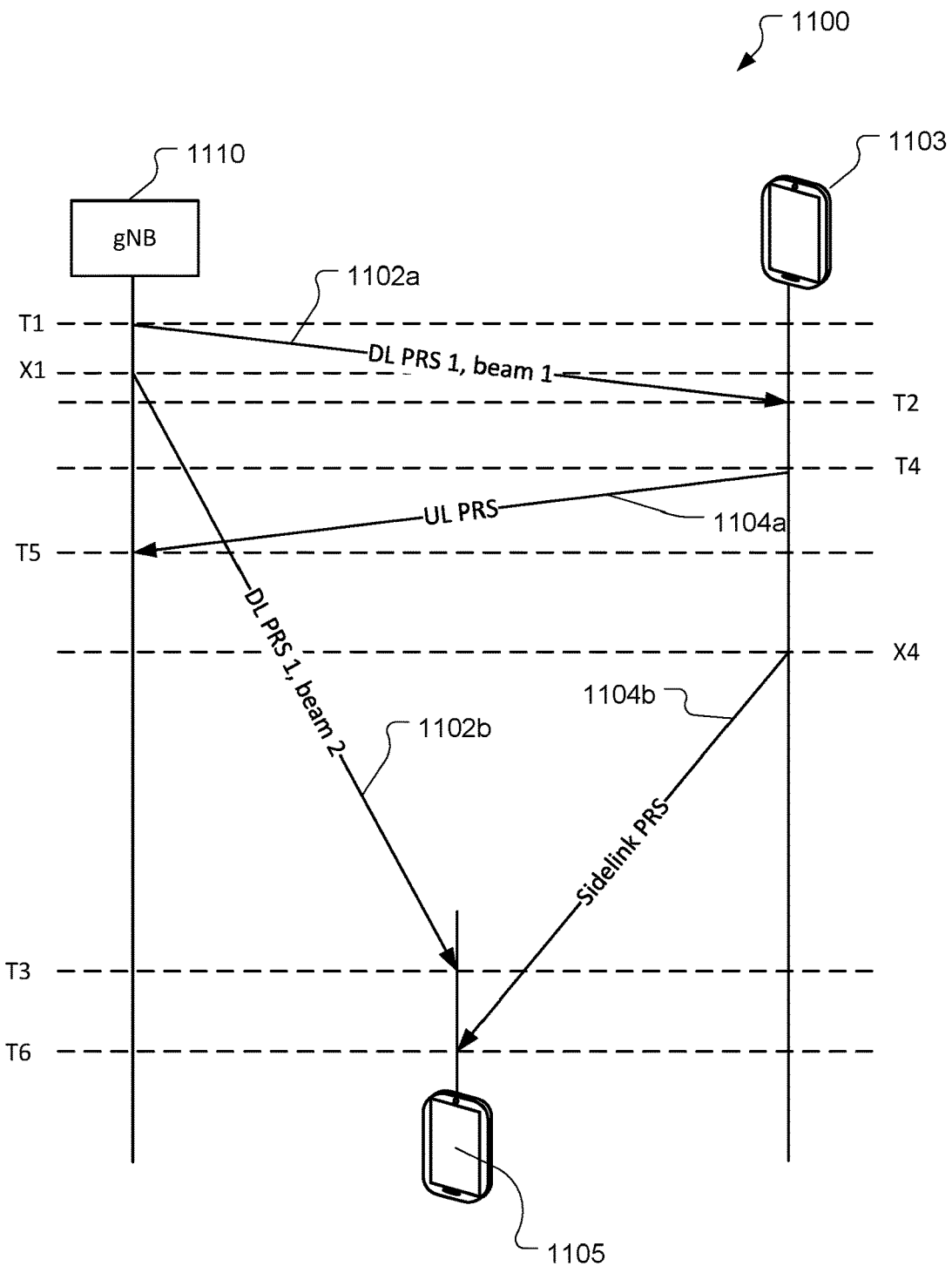
FIG. 11 is an example message flow for passive positioning with device-to-device sidelinks.

In an embodiment, one or more UEs may be configured to perform some or all of the functions of the base stations described herein. For example, a UE may be configured to determine a location (e.g., using inertial, satellite and/or terrestrial techniques) and transmit positioning reference signals to neighboring base stations and/or UEs. The UEs in a network may be configured to transmit omnidirectional sounding reference signals (SRS) for positioning and/or beamformed SRS for positioning based on the capabilities of the network and/or the UE. For example, UEs configured for 5G sub 6 GHz operations may utilize omnidirectional signaling, and UEs configured for higher frequencies may utilize analog beam forming. The UE may transmit SRS for positioning with existing uplink and sidelink communication interfaces such as Uu and PC5, for example. Referring to FIG. 11, an example message flow 1100 for passive positioning with a device-to-device sidelink is shown. The message flow 1100 includes a first base station 1110, a first UE 1103, and a second UE 1105. The base station 1110, may be a gNBs 110a-b or ng-eNB 114 and the UEs 1103, 1105 are examples of the UEs 105, 200. In an example, the message flow 1100 includes transmitting a first DL PRS on a first beam 1102a at time T1 with the base station 1110, such that the first beam 1102a is directed towards the first UE 1103 and received at time T2. The first base station 1110 transmits/sweeps the first DL PRS on a second beam 1102b at time X1. The UE 1105 is in a position to receive the second beam 1102b at time T3. The first UE 1103 is configured to transmit an UL PRS 1104a towards the base station 1110 at time T4, which is received at time T5. The first UE 1103 also transmits a sidelink PRS 1104b at time X4 and the second UE 1105 is in a position to receive the sidelink PRS 1104b at time T6. The sidelink PRS 1104b may be based on beamformed or omnidirectional transmissions. The base station 1110 and the first UE 1103 may be configured to indicate (e.g., via broadcasting or other signaling) the time differences between the transmissions of the DL PRS beams 1102a-b, and the transmission of the UL PRS 1104a and the sidelink PRS 1104b. For example, the base station 1110 may indicate the timing difference X1–T1, and the first UE 1103 may indicate the timing difference X4–T4. The UE 1105 is configured to perform RSTD measurements based on the time of arrivals T3 and T6 and compute distances between the stations based on the equations (5)-(7) above. In an example, the UE 1103 may initiate the PRS exchange with the base station 1110 such that the UL PRS is transmitted at time T1 and receive by the base station at time T2. While FIG. 11 depicts two UEs and one base station, the methods for passive positioning with analog beamforming described herein are not so limited. Various combinations of base stations and UEs may be used. Further, the base stations may be one or more of a variety of TRPs such as macro, pico and/or femto TRPs, and combinations of omnidirectional and beamformed transmissions may be used. The TRPs may include distributed radio heads. In an example, a TRP may be configured to transmit PRS on the same frequency layer or on different frequency layers. The PRS may be broadcast PRS and on-demand PRS (e.g., user or group specific), and may be transmitted via different interfaces (e.g., Uu and/or PC5/sidelink). The TRP may also be configured to utilize separate timing differences for different technologies and features (e.g., mmW and LTE/sub 6 GHz NR).

Figure 12:
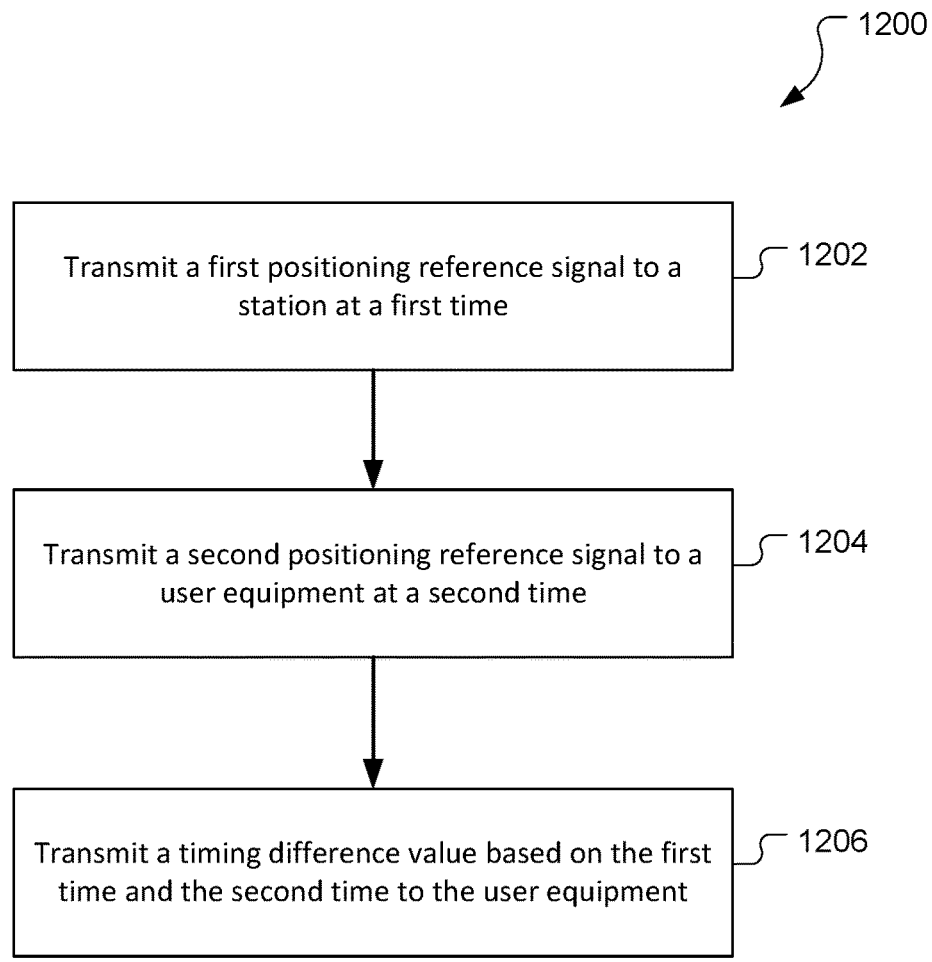
FIG. 12 is a process flow for an example method for providing positioning reference signals.

Referring to FIG. 12, with further reference to FIGS. 1-11, a method 1200 for providing positioning reference signals includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method 1200 includes transmitting a first positioning reference signal to a station at a first time. A TRP 300, including the transceiver 315 and the processor 310, is a means for transmitting a first positioning reference signal. The TRP 300 may be configured with a plurality of PRS resources to provide PRS transmissions on different transmit beams. For example, the first base station 1010 is an example of a TRP 300 and may transmit the first PRS on the first beam 1002a toward the second base station 1012 at time T1. In an example, the station may be a UE, such as the first UE 1103 in FIG. 11. The PRS resource may be associated with the station such that the azimuth (and optionally the elevation) of the PRS is directed towards the station.

At stage 1204, the method includes transmitting a second positioning reference signal to a user equipment at a second time. The TRP 300, including the transceiver 315 and the processor 310, is a means for transmitting a second PRS to a UE. The TRP may be configured to transmit a PRS resource on additional beams at different azimuths and/or elevations. The transmission times of the additional beams may be broadcast or provided to the UE via network signaling. In an example, referring to FIG. 9, the first DL PRS on the second beam 902b is transmitted at time X1 and receive by the UE 905 at time T3.

At stage 1206, the method includes transmitting a timing difference value based on the first time and the second time to the user equipment. The TRP 300, including the transceiver 315 and the processor 310, is a means for transmitting the timing difference value. Referring to FIG. 9, an example of the timing difference value includes the difference of the transmission times of the DL PRS on the first beam 902a and the second beam 902b (e.g., X1-T1). Referring to FIG. 10, the timing difference value may be based on a sweeping beam with a known period, such as the time difference between the transmission of the first DL PRS on the first beam 1002a and the sweeping beam 1002b. The timing differences may be broadcast or provided in network signaling (e.g., RRC, LPP, NRPP, MAC-CE, SIBs, etc.). In an example, the timing difference may be associated with a PRS beam identification or other signal characteristic (e.g., azimuth information) of a received beam based on a codebook stored locally on the UE.

In an embodiment, the method 1200 may be implemented by a UE, such as the first UE 1103 in FIG. 11. The PRS transmitted at the first time may be the UL PRS 1104a transmitted at time T4, and PRS transmitted at the second time may be the sidelink PRS 1104b transmitted at time X4. The time difference may be based on the difference value X4-T4. The PRS transmitted at the first time, and the PRS transmitted at the second time may utilize the same or different frequency layers, and may utilize different interfaces (e.g., Uu and/or PC5/sidelink). The timing difference value may be based on a time difference between signal in different technologies and features (e.g., mmW, LTE, sub 6 GHz NR). In an example, the PRS transmitted at the first time and the second time may be based a broadcast PRS, an on-demand PRS, or a combination of both.

Figure 13:
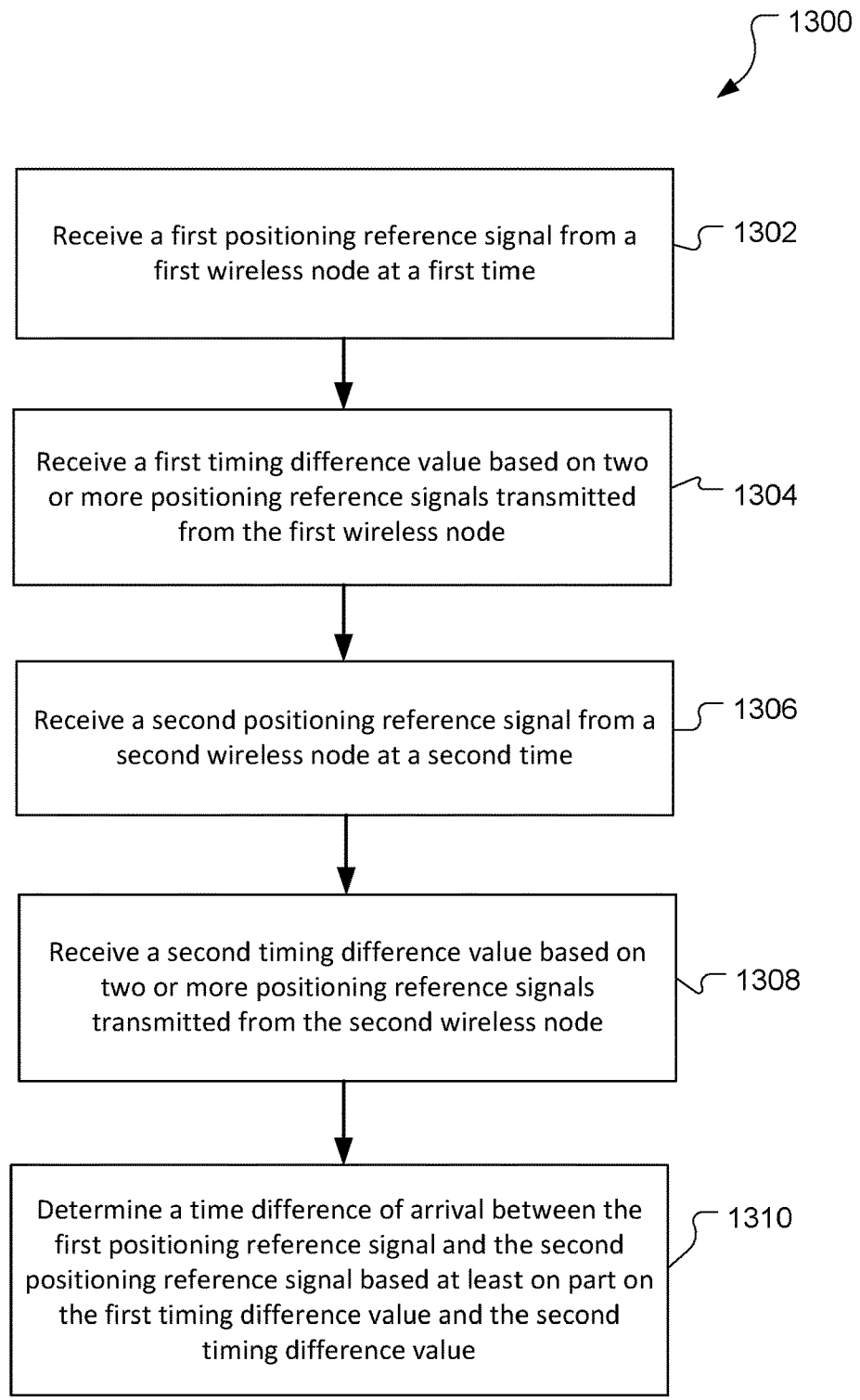
FIG. 13 is a process flow for an example method for passive positioning of a user equipment.

Referring to FIG. 13, with further reference to FIGS. 1-11, a method 1300 for passive positioning of a user equipment includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving a first positioning reference signal from a first wireless node at a first time. The UE 200, including the transceiver 215 and the processor 230, is a means for receiving the first PRS. The first wireless node may be a base station, a UE, or other wireless device with a known location. In an example, a TRP is configured to transmit a DL PRS on a first beam 902a to a second TRP. A second PRS resource may be configured to provide a DL PRS on a second beam 902b to the UE 905, which is received by the UE 905 at time T3. The direction of the second beam 902b may be based on an estimated position of the UE 905. In an example, the second beam 902b may be a sweeping beam configured to transmit DL PRS information across a range of azimuths in a coverage area. The UE may be configured to select a DL PRS based on established PRS scheduling information. In an example, the first PRS may be a user or group specific on-demand PRS.

At stage 1304, the method includes receiving a first timing difference value based on two or more positioning reference signals transmitted from the first wireless node. The UE 200, including the transceiver 215 and the processor 230, is a means for receiving the first timing difference value. The first timing difference value may be based on, for example, the time required by the first base station 910 to transmit the DL PRS on the first beam 902a and then transmit the DL PRS on the second beam 902b (e.g., X1-T1). The first timing value may be broadcast by the first base station 910, or by other base stations in a communication network. For example, the LMF 120 may be configured to provide the first timing value to the UE. Network signaling such as RRC may be used to provide the first timing difference value to the UE. In an embodiment, timing information may be embedded in one or more of the positioning reference signals and/or the sidelink signals.

At stage 1306, the method receiving a second positioning reference signal from a second wireless node at a second time. The UE 200, including the transceiver 215 and the processor 230, is a means for receiving the second PRS. The second wireless node may be a base station, a UE, or other wireless device with a known location. In an example, a second TRP, such as the second base station 912 is configured to send a DL PRS on a first beam 904a to the first base station 910 at time T4. The second base station 912 is configured to send a DL PRS on a second beam 904b at time X4, which is received by the UE at time T6. The direction of the second beam 904b may be based on an estimated position of the UE 905. In an example, the second beam 904b may be a sweeping beam configured to transmit DL PRS information across a range of azimuths in a coverage area of the second base station 912. The UE may be configured to select a DL PRS based on established PRS scheduling information. In an example, the second PRS may be a user or group specific broadcast on-demand PRS. The first and second PRS may be on the same frequency layer or on different frequency layers, and may utilize different technologies (e.g., LTE and 5G NR for dynamic spectrum sharing).

At stage 1308, the method includes receiving a second timing difference value based on two or more positioning reference signals transmitted from the second wireless node. The UE 200, including the transceiver 215 and the processor 230, is a means for receiving the second timing difference value. The second timing difference value may be based on, for example, the time required by the second base station 912 to transmit the DL PRS on the first beam 904a and then transmit the DL PRS on the second beam 904b (e.g., X4-T4). The second timing value may be broadcast by the second base station 912, or by other base stations in a communication network. For example, the LMF 120 may be configured to provide the second timing value to the UE. Network signaling such as RRC may be used to provide the second timing difference value to the UE.

At stage 1310, the method includes determining a time difference of arrival between the first positioning reference signal and the second positioning reference signal based at least in part on the first timing difference value and the second timing difference value. The UE 200, including the processor 230, is a means for determining the time difference of arrival. The UE may receive turn-around time and time of flight information associated with the first and second PRS transmissions from the base stations, serving station, or other network resources (e.g., the LMF 120) to perform RSTD measurements based on the arrival times T3 and T6. For example, the equations (5)-(7) may be used to determine the distances between the UE and the base stations. In an embodiment, the time difference of arrival information may be provided to the network (e.g., LMF 120) to determine a location of the UE 200. In another example, the UE 200 may be configured to utilize the time difference of arrival information and other assistance data (e.g., locations of the transmitting stations) to determine a location and report the location to the network.

In an embodiment, the functions of the wireless nodes in the method 1300 may be performed by a UE or other wireless station with a known position. For example, UL PRS and device-to-device sidelinks (e.g., PC5) may be used to provide PRS or other reference signals such as SRS for positioning. Other interfaces, such as the Uu interface, may be used to transmit one or more PRS. The wireless nodes may also be configured to send abort messages to the UE if the exchange of PRS beams between the stations fails (e.g., lose correspondence).

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for positioning a user equipment, comprising:
   receiving a first positioning reference signal from a first wireless node at a first time;
   receiving a first timing difference value based on two or more positioning reference signals transmitted from the first wireless node;
   receiving a second positioning reference signal from a second wireless node at a second time;
   receiving a second timing difference value based on two or more positioning reference signals transmitted from the second wireless node; and
   determining a time difference of arrival between the first positioning reference signal and the second positioning reference signal based at least in part on the first timing difference value and the second timing difference value.

2. The method of clause 1 further comprising receiving a turn-around time value and a time of flight value associated with the first positioning reference signal and the second positioning reference signal.

3. The method of clause 1 wherein the first timing difference value is received from the first wireless node and the second timing difference value is received from the second wireless node.

4. The method of clause 1 wherein the first timing difference value and the second timing difference value is received from a network server or a serving station.

5. The method of clause 1 wherein the first timing difference value is included in the first positioning reference signal, and the second timing difference value is included in the second positioning reference signal.

6. The method of clause 1 wherein the first timing difference value and the second timing difference value are received via a higher layer protocol.

7. The method of clause 1 wherein the first timing difference value is associated with a beam identification value of the first positioning reference signal.

8. The method of clause 1 wherein the second wireless node is a second user equipment and the second positioning reference signal is received via a sidelink transmitted from the second user equipment.

9. The method of clause 1 wherein the first positioning reference signal is transmitted via a beam transmitted from the first wireless node.

10. The method of clause 1 further comprising determining a position estimate based at least in part on the time difference of arrival.

11. The method of clause 1 wherein the first positioning reference signal and the second positioning reference signal are from different frequency layers.

12. A method for providing positioning reference signals, comprising:
transmitting a first positioning reference signal to a station at first time;
transmitting a second positioning reference signal to a user equipment at a second time; and
transmitting a timing difference value based on the first time and the second time to the user equipment.

13. The method of clause 12 wherein transmitting the first positioning reference signal to the station includes beamforming the first positioning reference signal based on a location of the station.

14. The method of clause 12 wherein transmitting the second positioning reference signal to the user equipment includes beamforming the second positioning reference signal based on a location of the user equipment.

15. The method of clause 12 further comprising:
receiving a third positioning reference signal from the station at a third time; and
transmitting the third time to the user equipment.

16. The method of clause 12 wherein transmitting the first positioning reference signal to the station at the first time includes transmitting the first positioning reference signal from a second user equipment.

17. The method of clause 12 wherein transmitting the second positioning reference signal to the user equipment includes transmitting a sidelink signal to the user equipment.

18. The method of clause 12 wherein the timing difference value is transmitted via a higher layer protocol.

19. The method of clause 12 wherein the timing difference value is transmitted to the user equipment with the second positioning reference signal.

20. The method of clause 12 wherein the first positioning reference signal and the second positioning reference signal are transmitted via sweeping beams.

21. An apparatus for positioning a user equipment, comprising:
a memory;
at least one transceiver;
at least one processor communicatively coupled to the memory and the at least one transceiver and configured to:
receive a first positioning reference signal from a first wireless node at a first time;
receive a first timing difference value based on two or more positioning reference signals transmitted from the first wireless node;
receive a second positioning reference signal from a second wireless node at a second time;
receive a second timing difference value based on two or more positioning reference signals transmitted from the second wireless node; and
determine a time difference of arrival between the first positioning reference signal and the second positioning reference signal based at least in part on the first timing difference value and the second timing difference value.

22. The apparatus of clause 21 wherein the at least one processor is further configured to receive a turn-around time value and a time of flight value associated with the first positioning reference signal and the second positioning reference signal.

23. The apparatus of clause 21 wherein the first timing difference value is received from the first wireless node and the second timing difference value is received from the second wireless node.

24. The apparatus of clause 21 wherein the first timing difference value and the second timing difference value is received from a network server or a serving station.

25. The apparatus of clause 21 wherein the first timing difference value is included in the first positioning reference signal, and the second timing difference value is included in the second positioning reference signal.

26. The apparatus of clause 21 wherein the first timing difference value and the second timing difference value are received via a higher layer protocol.

27. The apparatus of clause 21 wherein the first timing difference value is associated with a beam identification value of the first positioning reference signal.

28. The apparatus of clause 21 wherein the second wireless node is a second user equipment and the second positioning reference signal is received via a sidelink transmitted from the second user equipment.

29. The apparatus of clause 21 wherein the first positioning reference signal is transmitted via a beam transmitted from the first wireless node.

30. The apparatus of clause 21 wherein the at least one processor is further configured to determine a position estimate based at least in part on the time difference of arrival.

31. The apparatus of clause 21 wherein the first positioning reference signal and the second positioning reference signal are from different frequency layers.

32. An apparatus for providing positioning reference signals, comprising:
a memory;
at least one transceiver;
at least one processor communicatively coupled to the memory and the at least one transceiver and configured to:
transmit a first positioning reference signal to a station at first time;
transmit a second positioning reference signal to a user equipment at a second time; and
transmit a timing difference value based on the first time and the second time to the user equipment.

33. The apparatus of clause 32 wherein the at least one processor is further configured to beamform the first positioning reference signal based on a location of the station.

34. The apparatus of clause 32 wherein the at least one processor is further configured to beamform the second positioning reference signal based on a location of the user equipment.

35. The apparatus of clause 32 wherein the at least one processor is further configured to:
receive a third positioning reference signal from the station at a third time; and
transmit the third time to the user equipment.

36. The apparatus of clause 32 wherein the at least one processor is further configured to transmit the first positioning reference signal from a second user equipment.

37. The apparatus of clause 32 wherein the at least one processor is further configured to transmit a sidelink signal to the user equipment.

38. The apparatus of clause 32 wherein the timing difference value is transmitted via a higher layer protocol.

39. The apparatus of clause 32 wherein the timing difference value is transmitted to the user equipment with the second positioning reference signal.

40. The apparatus of clause 32 wherein the at least one processor is further configured to transmit the first positioning reference signal and the second positioning reference signal via sweeping beams.

41. An apparatus for positioning a user equipment, comprising:
means for receiving a first positioning reference signal from a first wireless node at a first time;
means for receiving a first timing difference value based on two or more positioning reference signals transmitted from the first wireless node;
means for receiving a second positioning reference signal from a second wireless node at a second time;
means for receiving a second timing difference value based on two or more positioning reference signals transmitted from the second wireless node; and
means for determining a time difference of arrival between the first positioning reference signal and the second positioning reference signal based at least in part on the first timing difference value and the second timing difference value.

42. The apparatus of clause 41 further comprising means for receiving a turn-around time value and a time of flight value associated with the first positioning reference signal and the second positioning reference signal.

43. The apparatus of clause 41 wherein the first timing difference value is received from the first wireless node and the second timing difference value is received from the second wireless node.

44. The apparatus of clause 41 wherein the first timing difference value and the second timing difference value is received from a network server or a serving station.

45. The apparatus of clause 41 wherein the first timing difference value is included in the first positioning reference signal, and the second timing difference value is included in the second positioning reference signal.

46. The apparatus of clause 41 wherein the first timing difference value and the second timing difference value are received via a higher layer protocol.

47. The apparatus of clause 41 wherein the first timing difference value is associated with a beam identification value of the first positioning reference signal.

48. The apparatus of clause 41 wherein the second wireless node is a second user equipment and the second positioning reference signal is received via a sidelink transmitted from the second user equipment.

49. The apparatus of clause 41 wherein the first positioning reference signal is transmitted via a beam transmitted from the first wireless node.

50. The apparatus of clause 41 further comprising means for determining a position estimate based at least in part on the time difference of arrival.

51. The apparatus of clause 41 wherein the first positioning reference signal and the second positioning reference signal are from different frequency layers.

52. An apparatus for providing positioning reference signals, comprising:
means for transmitting a first positioning reference signal to a station at first time;
means for transmitting a second positioning reference signal to a user equipment at a second time; and
means for transmitting a timing difference value based on the first time and the second time to the user equipment.

53. The apparatus of clause 52 wherein the means for transmitting the first positioning reference signal to the station includes means for beamforming the first positioning reference signal based on a location of the station.

54. The apparatus of clause 52 wherein the means transmitting the second positioning reference signal to the user equipment includes means for beamforming the second positioning reference signal based on a location of the user equipment.

55. The apparatus of clause 52 further comprising:
means for receiving a third positioning reference signal from the station at a third time; and
means for transmitting the third time to the user equipment.

56. The apparatus of clause 52 wherein the means for transmitting the first positioning reference signal to the station at the first time includes means for transmitting the first positioning reference signal from a second user equipment.

57. The apparatus of clause 52 wherein the means for transmitting the second positioning reference signal to the user equipment includes means for transmitting a sidelink signal to the user equipment.

58. The apparatus of clause 52 wherein the timing difference value is transmitted via a higher layer protocol.

59. The apparatus of clause 52 wherein the timing difference value is transmitted to the user equipment with the second positioning reference signal.

60. The apparatus of clause 52 wherein the first positioning reference signal and the second positioning reference signal are transmitted via sweeping beams.

61. A non-transitory processor-readable storage medium comprising processor-readable instructions configured to cause one or more processors for positioning a user equipment, comprising:
code for receiving a first positioning reference signal from a first wireless node at a first time;
code for receiving a first timing difference value based on two or more positioning reference signals transmitted from the first wireless node;
code for receiving a second positioning reference signal from a second wireless node at a second time;
code for receiving a second timing difference value based on two or more positioning reference signals transmitted from the second wireless node; and
code for determining a time difference of arrival between the first positioning reference signal and the second positioning reference signal based at least in part on the first timing difference value and the second timing difference value.

62. The non-transitory processor-readable storage medium of clause 61 further comprising code for receiving a turn-around time value and a time of flight value associated with the first positioning reference signal and the second positioning reference signal.

63. The non-transitory processor-readable storage medium of clause 62 wherein the first timing difference value is received from the first wireless node and the second timing difference value is received from the second wireless node.

64. The non-transitory processor-readable storage medium of clause 61 wherein the first timing difference value and the second timing difference value is received from a network server or a serving station.

65. The non-transitory processor-readable storage medium of clause 61 wherein the first timing difference value is included in the first positioning reference signal, and the second timing difference value is included in the second positioning reference signal.

66. The non-transitory processor-readable storage medium of clause 61 wherein the first timing difference value and the second timing difference value are received via a higher layer protocol.

67. The non-transitory processor-readable storage medium of clause 61 wherein the first timing difference value is associated with a beam identification value of the first positioning reference signal.

68. The non-transitory processor-readable storage medium of clause 61 wherein the second wireless node is a second user equipment and the second positioning reference signal is received via a sidelink transmitted from the second user equipment.

69. The non-transitory processor-readable storage medium of clause 61 wherein the first positioning reference signal is transmitted via a beam transmitted from the first wireless node.

70. The non-transitory processor-readable storage medium of clause 61 further comprising code for determining a position estimate based at least in part on the time difference of arrival.

71. The non-transitory processor-readable storage medium of clause 61 wherein the first positioning reference signal and the second positioning reference signal are from different frequency layers.

72. A non-transitory processor-readable storage medium comprising processor-readable instructions configured to cause one or more processors for providing positioning reference signals, comprising:

code for transmitting a first positioning reference signal to a station at first time;

code for transmitting a second positioning reference signal to a user equipment at a second time; and code for transmitting a timing difference value based on the first time and the second time to the user equipment.

73. The non-transitory processor-readable storage medium of clause 72 wherein the code for transmitting the first positioning reference signal to the station includes code for beamforming the first positioning reference signal based on a location of the station.

74. The non-transitory processor-readable storage medium of clause 72 wherein the code transmitting the second positioning reference signal to the user equipment includes code for beamforming the second positioning reference signal based on a location of the user equipment.

75. The non-transitory processor-readable storage medium of clause 72 further comprising:

code for receiving a third positioning reference signal from the station at a third time; and code for transmitting the third time to the user equipment.

76. The non-transitory processor-readable storage medium of clause 72 wherein the code for transmitting the first positioning reference signal to the station at the first time includes code for transmitting the first positioning reference signal from a second user equipment.

77. The non-transitory processor-readable storage medium of clause 72 wherein the code for transmitting the second positioning reference signal to the user equipment includes code for transmitting a sidelink signal to the user equipment.

78. The non-transitory processor-readable storage medium of clause 72 wherein the timing difference value is transmitted via a higher layer protocol.

79. The non-transitory processor-readable storage medium of clause 72 wherein the timing difference value is transmitted to the user equipment with the second positioning reference signal.

80. The non-transitory processor-readable storage medium of clause 72 wherein the first positioning reference signal and the second positioning reference signal are transmitted via a sweeping beam.

The invention claimed is:

1. A method for positioning a user equipment, comprising:

receiving a first positioning reference signal from a first wireless node at a first time;

receiving a first timing difference value indicative of a time difference between transmission of the first positioning reference signal and transmission of a second positioning reference signal transmitted from the first wireless node;

receiving a third positioning reference signal from a second wireless node at a second time;

receiving a second timing difference value indicative of a time difference between transmission of the third positioning reference signal and transmission of a fourth positioning reference signal transmitted from the second wireless node; and determining a time difference of arrival between the first positioning reference signal and the third positioning reference signal based at least in part on the first timing difference value, the second timing difference value, a timing of receipt of the first positioning reference signal at the user equipment, and a timing of receipt of the third positioning reference signal at the user equipment.

2. The method of claim 1 further comprising receiving a turn-around time value and a time of flight value associated with the first positioning reference signal and the third positioning reference signal.

3. The method of claim 1 wherein the first timing difference value is received from the first wireless node and the second timing difference value is received from the second wireless node.

4. The method of claim 1 wherein the first timing difference value and the second timing difference value is received from a network server or a serving station.

5. The method of claim 1 wherein the first timing difference value is included in the first positioning reference signal, and the second timing difference value is included in the third positioning reference signal.

6. The method of claim 1 wherein the first timing difference value and the second timing difference value are received via a higher layer protocol.

7. The method of claim 1 wherein the first timing difference value is associated with a beam identification value of the first positioning reference signal.

8. The method of claim 1 wherein the second wireless node is a second user equipment and the third positioning reference signal is received via a sidelink transmitted from the second user equipment.

9. The method of claim 1 wherein the first positioning reference signal is transmitted via a beam transmitted from the first wireless node.

10. The method of claim 1 further comprising determining a position estimate based at least in part on the time difference of arrival.

11. The method of claim 1 wherein the first positioning reference signal and the third positioning reference signal are from different frequency layers.

12. An apparatus for positioning a user equipment, comprising:
a memory;
at least one transceiver;
at least one processor communicatively coupled to the memory and the at least one transceiver and configured to:
receive a first positioning reference signal from a first wireless node at a first time;
receive a first timing difference value indicative of a time difference between transmission of the first positioning reference signal and transmission of a positioning reference signal transmitted from the first wireless node;
receive a third positioning reference signal from a second wireless node at a second time;
receive a second timing difference value indicative of a time difference between transmission of the third positioning reference signal and transmission of a fourth positioning reference signal transmitted from the second wireless node; and
determining a time difference of arrival between the first positioning reference signal and the third positioning reference signal based at least in part on the first timing difference value, the second timing difference value, a timing of receipt of the first positioning reference signal at the user equipment, and a timing of receipt of the third positioning reference signal at the user equipment.

13. The apparatus of claim 12 wherein the at least one processor is further configured to receive a turn-around time value and a time of flight value associated with the first positioning reference signal and the third positioning reference signal.

14. The apparatus of claim 12 wherein the first timing difference value is received from the first wireless node and the second timing difference value is received from the second wireless node.

15. The apparatus of claim 12 wherein the first timing difference value and the second timing difference value is received from a network server or a serving station.

16. The apparatus of claim 12 wherein the first timing difference value is included in the first positioning reference signal, and the second timing difference value is included in the third positioning reference signal.

17. The apparatus of claim 12 wherein the first timing difference value and the second timing difference value are received via a higher layer protocol.

18. The apparatus of claim 12 wherein the first timing difference value is associated with a beam identification value of the first positioning reference signal.

19. The apparatus of claim 12 wherein the second wireless node is a second user equipment and the third positioning reference signal is received via a sidelink transmitted from the second user equipment.

20. The apparatus of claim 12 wherein the first positioning reference signal is transmitted via a beam transmitted from the first wireless node.

21. The apparatus of claim 12 wherein the at least one processor is further configured to determine a position estimate based at least in part on the time difference of arrival.

22. The apparatus of claim 12 wherein the first positioning reference signal and the third positioning reference signal are from different frequency layers.

23. An apparatus for positioning a user equipment, comprising:
means for receiving a first positioning reference signal from a first wireless node at a first time;
means for receiving a first timing difference value indicative of a time difference between transmission of the first positioning reference signal and transmission of a positioning reference signal transmitted from the first wireless node;
means for receiving a third positioning reference signal from a second wireless node at a second time;
means for receiving a second timing difference value indicative of a time difference between transmission of the third positioning reference signal and transmission of a fourth positioning reference signal transmitted from the second wireless node; and
means for determining a time difference of arrival between the first positioning reference signal and the third positioning reference signal based at least in part on the first timing difference value, the second timing difference value, a timing of receipt of the first positioning reference signal at the user equipment, and a timing of receipt of the third positioning reference signal at the user equipment.

24. The apparatus of claim 23 further comprising means for receiving a turn-around time value and a time of flight value associated with the first positioning reference signal and the third positioning reference signal.

25. The apparatus of claim 23 wherein the first timing difference value is received from the first wireless node and the second timing difference value is received from the second wireless node.

26. The apparatus of claim 23 wherein the first timing difference value and the second timing difference value is received from a network server or a serving station.

27. The apparatus of claim 23 wherein the first timing difference value is included in the first positioning reference signal, and the second timing difference value is included in the third positioning reference signal.

28. The apparatus of claim 23 wherein the first timing difference value and the second timing difference value are received via a higher layer protocol.

29. The apparatus of claim 23 wherein the first timing difference value is associated with a beam identification value of the first positioning reference signal.

30. The apparatus of claim 23 wherein the second wireless node is a second user equipment and the third positioning reference signal is received via a sidelink transmitted from the second user equipment.

31. The apparatus of claim 23 wherein the first positioning reference signal is transmitted via a beam transmitted from the first wireless node.

32. The apparatus of claim 23 further comprising means for determining a position estimate based at least in part on the time difference of arrival.

33. The apparatus of claim 23 wherein the first positioning reference signal and the third positioning reference signal are from different frequency layers.

34. A non-transitory processor-readable storage medium comprising processor-readable instructions configured to cause one or more processors for positioning a user equipment, comprising:
code for receiving a first positioning reference signal from a first wireless node at a first time;
code for receiving a first timing difference value indicative of a time difference between transmission of the first positioning reference signal and transmission of a positioning reference signal transmitted from the first wireless node;

code for receiving a third positioning reference signal from a second wireless node at a second time;

code for receiving a second timing difference value indicative of a time difference between transmission of the third positioning reference signal and transmission of a fourth positioning reference signal transmitted from the second wireless node; and code for determining a time difference of arrival between the first positioning reference signal and the third positioning reference signal based at least in part on the first timing difference value, the second timing difference value, a timing of receipt of the first positioning reference signal at the user equipment, and a timing of receipt of the third positioning reference signal at the user equipment.

35. The non-transitory processor-readable storage medium of claim 34 further comprising code for receiving a turn-around time value and a time of flight value associated with the first positioning reference signal and the third positioning reference signal.

36. The non-transitory processor-readable storage medium of claim 35 wherein the first timing difference value is received from the first wireless node and the second timing difference value is received from the second wireless node.

37. The non-transitory processor-readable storage medium of claim 34 wherein the first timing difference value and the second timing difference value is received from a network server or a serving station.

38. The non-transitory processor-readable storage medium of claim 34 wherein the first timing difference value is included in the first positioning reference signal, and the second timing difference value is included in the third positioning reference signal.

39. The non-transitory processor-readable storage medium of claim 34 wherein the first timing difference value and the second timing difference value are received via a higher layer protocol.

40. The non-transitory processor-readable storage medium of claim 34 wherein the first timing difference value is associated with a beam identification value of the first positioning reference signal.

41. The non-transitory processor-readable storage medium of claim 34 wherein the second wireless node is a second user equipment and the third positioning reference signal is received via a sidelink transmitted from the second user equipment.

42. The non-transitory processor-readable storage medium of claim 34 wherein the first positioning reference signal is transmitted via a beam transmitted from the first wireless node.

43. The non-transitory processor-readable storage medium of claim 34 further comprising code for determining a position estimate based at least in part on the time difference of arrival.

44. The non-transitory processor-readable storage medium of claim 34 wherein the first positioning reference signal and the third positioning reference signal are from different frequency layers.

* * * * *